(12) United States Patent
Kim et al.

(10) Patent No.: US 11,038,199 B2
(45) Date of Patent: Jun. 15, 2021

(54) SOLID ELECTROLYTE, METHOD OF PREPARING THE SAME, AND SECONDARY BATTERY INCLUDING THE SAME

(71) Applicants: Samsung Electronics Co., Ltd., Suwon-si (KR); CORNING INCORPORATED, Corning, NY (US)

(72) Inventors: Jusik Kim, Hwaseong-si (KR); Sewon Kim, Suwon-si (KR); Hyunseok Kim, Suwon-si (KR); Michael Edward Badding, Corning, NY (US); Zhen Song, Corning, NY (US); Karen E. Thomas-Alyea, Mountain View, CA (US); Lincoln James Miara, Mountain View, CA (US); Dongmin Im, Seoul (KR)

(73) Assignees: SAMSUNG ELECTRONICS CO., LTD., Gyeonggi-do (KR); CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/298,167

(22) Filed: Mar. 11, 2019

(65) Prior Publication Data

US 2020/0083562 A1    Mar. 12, 2020

(30) Foreign Application Priority Data

Sep. 6, 2018  (KR) .......................... 10-2018-0106504

(51) Int. Cl.
   *H01M 2/16*     (2006.01)
   *H01M 10/0562*  (2010.01)
   *H01M 10/0525*  (2010.01)

(52) U.S. Cl.
   CPC ... *H01M 10/0562* (2013.01); *H01M 10/0525* (2013.01); *H01M 2300/0068* (2013.01); *H01M 2300/0094* (2013.01)

(58) Field of Classification Search
   CPC ......... H01M 10/0561; H01M 10/0562; H01M 10/056; H01M 10/052; H01M 10/0525;
   (Continued)

(56) References Cited

U.S. PATENT DOCUMENTS 7,513,136 B2    4/2009  Laliberte et al.
7,993,782 B2    8/2011  Takada et al.
(Continued)

FOREIGN PATENT DOCUMENTS

JP    199489736 A    3/1994
JP    2007266330 A   10/2007
(Continued)

OTHER PUBLICATIONS

Kun Fu et al., "Three-dimensional bilayer garnet solid electrolyte based high energy density lithium metal-sulfur batteries", Energy & Environmental Science, May 10, 2017, pp. 1-8, Issue 7.
(Continued)

*Primary Examiner* — Raymond Alejandro
(74) *Attorney, Agent, or Firm* — Cantor Colburn LLP

(57) ABSTRACT

A solid electrolyte including an inorganic lithium ion conductive film and a porous layer on a surface of the inorganic lithium ion conductive film, wherein the porous layer includes a first porous layer and a second porous layer, and the second porous layer is disposed between the inorganic lithium ion conductive film and the first porous layer, and wherein the first porous layer has a size greater which is than a pore size of the second porous layer.

37 Claims, 27 Drawing Sheets

(58) Field of Classification Search
CPC . H01M 2300/0065; H01M 2300/0068; H01M 2300/0071; H01M 2300/0094; H01M 2300/0088
See application file for complete search history.

(56) References Cited

U.S. PATENT DOCUMENTS

| | | |
|---|---|---|
| 8,012,631 B2 | 9/2011 | Seino et al. |
| 8,075,865 B2 | 12/2011 | Deiseroth et al. |
| 8,658,317 B2 | 2/2014 | Weppner |
| 9,608,288 B2 | 3/2017 | Yamada et al. |
| 9,620,811 B2 | 4/2017 | Kambara et al. |
| 9,692,041 B2 | 6/2017 | Aihara et al. |
| 9,728,808 B2 | 8/2017 | Sugiura et al. |
| 9,812,734 B2 | 11/2017 | Miyashita et al. |
| 9,853,323 B2 | 12/2017 | Visbal et al. |
| 9,929,433 B2 | 3/2018 | Kanno et al. |
| 2009/0263725 A1 | 10/2009 | Balsara et al. |
| 2012/0052396 A1 | 3/2012 | Tsuchida et al. |
| 2012/0276434 A1 | 11/2012 | Gaikwad et al. |
| 2013/0004858 A1 | 1/2013 | Yamada et al. |
| 2013/0260023 A1 | 10/2013 | Suyama et al. |
| 2014/0011100 A1 | 1/2014 | Lee et al. |
| 2014/0038054 A1 | 2/2014 | Tojigamori Takeshi et al. |
| 2014/0082931 A1 | 3/2014 | Nishino et al. |
| 2014/0087270 A1 | 3/2014 | Yoshida |
| 2014/0162138 A1 | 6/2014 | Fujiki et al. |
| 2014/0162141 A1 | 6/2014 | Fujiki et al. |
| 2015/0037688 A1 | 2/2015 | Otsuka et al. |
| 2015/0111110 A1 | 4/2015 | Watanabe et al. |
| 2015/0147660 A1 | 5/2015 | Fujiki et al. |
| 2016/0043392 A1 | 2/2016 | Fujiki et al. |
| 2016/0064772 A1 | 3/2016 | Choi et al. |
| 2016/0087306 A1 | 3/2016 | Lee et al. |
| 2016/0093916 A1 | 3/2016 | Moon et al. |
| 2016/0149260 A1 | 5/2016 | Badding et al. |
| 2016/0226097 A1 | 8/2016 | Wegner et al. |
| 2016/0248093 A1 | 8/2016 | Sugiura et al. |
| 2017/0047610 A1 | 2/2017 | Miara et al. |
| 2017/0062829 A1 | 3/2017 | Ryu et al. |
| 2017/0155169 A1 | 6/2017 | Hitz et al. |
| 2017/0317352 A1 | 11/2017 | Lee et al. |
| 2017/0324097 A1 | 11/2017 | Lee et al. |
| 2018/0226633 A1 | 8/2018 | Fujiki et al. |
| 2018/0316051 A1 | 11/2018 | Lee et al. |
| 2019/0044186 A1 | 2/2019 | Kim et al. |

FOREIGN PATENT DOCUMENTS

| | | |
|---|---|---|
| JP | 2011150932 A | 8/2011 |
| JP | 2013232284 A | 11/2013 |
| JP | 2017111890 A | 6/2017 |
| JP | 2018502809 A | 2/2018 |
| WO | 2017116599 A2 | 7/2017 |
| WO | WO 2017/116599 * | 7/2017 |

OTHER PUBLICATIONS

EP European Search Report for European Patent Application No. 19161008.8 dated Jun. 6, 2019.

Brugge et al., "Garnet Electrolytes for Solid State Batteries: Visualization of Moisture-Induced Chemical Degradation and Revealing Its Impact on the Li-Ion Dynamics", Chemistry of Materials, 30, Jun. 12, 2018, 3704-3713.

Xu et al., "Three-Dimensional, Solid-State Mixed Electron-Ion Conductive Framework for Lithium Metal Anode", Nano Letters, 18, Jun. 13, 2018, 3926-3933.

Eric Jianfeng Cheng et al., "Intergranular Li metal propagation through polycrystalline Li6.25Al0.25La3Zr2O12 ceramic electrolyte," Electrochimica Acta, Dec. 6, 2016, vol. 223, pp. 85-91.

* cited by examiner

SOLID ELECTROLYTE, METHOD OF PREPARING THE SAME, AND SECONDARY BATTERY INCLUDING THE SAME

CROSS-REFERENCE TO RELATED APPLICATION

This application claims priority to and the benefit of Korean Patent Application No. 10-2018-106504, filed on Sep. 6, 2018, in the Korean Intellectual Property Office, and all the benefits therefrom under 35 U.S.C. § 119, the content of which is incorporated herein in its entirety by reference.

BACKGROUND

1. Field

The present disclosure relates to a solid electrolyte for a secondary battery, a method of preparing the same, and a secondary battery including the same.

2. Description of the Related Art

With the explosive growth of reusable energy storage devices applicable to electric vehicles and portable electronic devices, there is an increasing need for a lithium secondary battery having high capacity and improved stability. A lithium metal electrode, as a negative electrode for a lithium secondary battery, has been investigated as an option to increase charge storage capacity and provide a secondary battery having a high voltage.

However, when an inorganic solid electrolyte is used as an electrolyte in a lithium secondary battery including a lithium metal electrode, a short circuit may occur due to lithium penetration into grain boundaries of the inorganic solid electrolyte, and interfacial resistance between the lithium metal electrode and the solid electrolyte may increase.

There thus remains a need for an improved lithium secondary battery solid electrolyte.

SUMMARY

Provided is a solid electrolyte and a method of preparing the same.

Provided is a secondary battery including the solid electrolyte.

Additional aspects will be set forth in part in the description which follows and, in part, will be apparent from the description, or may be learned by practice of the presented embodiments.

According to an aspect of an embodiment, a solid electrolyte includes an inorganic lithium ion conductive film; and a porous layer on a surface of the inorganic lithium ion conductive film, wherein the porous layer comprises a first porous layer and a second porous layer, and the second porous layer is disposed between the inorganic lithium ion conductive film and the first porous layer, and wherein the first porous layer has a pore size which is greater than a pore size of the second porous layer.

According to an aspect of another embodiment, a secondary battery includes a positive electrode, a negative electrode, and the solid electrolyte interposed between the positive electrode and the negative electrode.

According to an aspect of another embodiment, a method of preparing a solid electrolyte includes: a first acid treatment comprising acid-treating an inorganic lithium ion conductive film with an acid having a concentration of greater than or equal to about 0.1 molar (M) and less than or equal to about 5 molar to provide a first acid-treated product; and a first cleaning comprising cleaning the first acid-treated product to provide a cleaned first acid-treated product to prepare the solid electrolyte.

The inorganic lithium ion conductive film may be prepared by mixing an inorganic lithium ion conductor and a lithium compound to prepare a mixture, and heat-treating the mixture.

The method further includes a second acid treatment including acid-treating the cleaned first acid-treated product with an acid having a concentration of more than 0.1 M and less than 0.5 M to provide a second acid-treated product, and a second cleaning process including cleaning the second acid-treated product.

According to an aspect of another embodiment, a method of preparing a solid electrolyte includes forming a multilayer film on a surface of an inorganic lithium ion conductor film, the forming including: coating a first composition comprising a pore former and a lithium ion conductor on a surface of the inorganic lithium ion conductive film, and drying the first composition, coating a second composition comprising a pore former and a lithium ion conductor on the dried first composition, and drying the second composition to form the multilayer film; and heat-treating the multilayer film to prepare the solid electrolyte.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
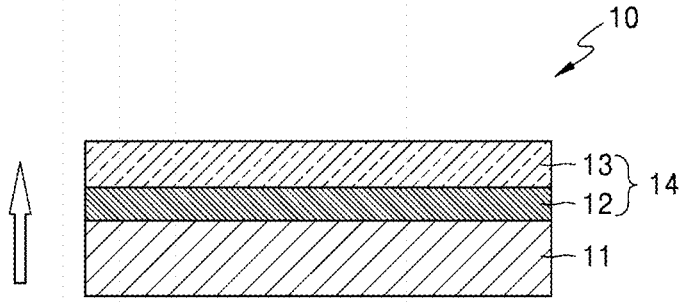
FIG. 1 is a schematic diagram illustrating an embodiment of a structure of a solid electrolyte.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." As used herein, the term "and/or" includes any and all combinations of one or more of the associated listed items. Expressions such as "at least one of," when preceding a list of elements, modify the entire list of elements and do not modify the individual elements of the list.

As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a solid electrolyte, a method of preparing the same, and a secondary battery including the solid electrolyte will be described.

A solid electrolyte according to an embodiment includes an inorganic lithium ion conductive film and a porous layer on a surface of the inorganic lithium ion conductive film, wherein the porous layer comprises a first porous layer and a second porous layer, and the second porous layer is disposed between the inorganic lithium ion conductive film and the first porous layer, wherein the first porous layer has a pore size which is greater than a pore size of the second porous layer.

The first porous layer, which is on the second porous layer and opposite the inorganic lithium ion conductive film, may have a greater porosity than a porosity of the second porous layer, which is located between the first porous layer and the inorganic lithium ion conductive film. The porous layer may have a structure in which a pore size gradually increases in a thickness direction of the solid electrolyte. The pore size may increase linearly or non-linearly in the thickness direction. More specifically, the pore size of the porous layer gradually increases in a direction from the surface of the inorganic lithium ion conductive film to the outer surface of the porous layer. When a porosity gradient or a pore size gradient of the solid electrolyte is as described above, the solid electrolyte may have improved ionic conductivity and mechanical strength. As used herein, the term "thickness direction" refers to a direction from the inorganic lithium ion conductive film 11 towards the opposite surface of the solid electrolyte, as shown in FIG. 1.

An inorganic solid electrolyte may be used as an electrolyte in a lithium secondary battery including a lithium metal electrode. When the inorganic solid electrolyte is used, lithium penetration into a grain boundary of the inorganic solid electrolyte may occur. As a result, lithium ion conductivity may decrease at the grain boundary, a short circuit may occur due to lithium plating on or in the grain boundary, and resistance of the battery may be increased due to interfacial resistance between the lithium metal electrode and the solid electrolyte.

The inventors have developed a solid electrolyte including a porous layer located on at least one surface thereof, wherein a pore size at the surface of the porous layer is greater than a pore size inside the porous layer. In an embodiment, a region of the porous layer located on the surface of the solid electrolyte may have a greater porosity than another region of the porous layer located inside the solid electrolyte. In the solid electrolyte, when the pore size and the porosity at the surface are greater than in the interior of the porous layer as described above, a contact area between an electrode in contact with the solid electrolyte and the solid electrolyte increases, thereby reducing interfacial resistance. Thus, since the surface of the solid electrolyte has a porous structure with a large surface area, stress of electrodeposited lithium metal, e.g., lithium electrodeposited at a high current density, may not be concentrated in a localized area of the solid electrolyte, e.g., at a defect. In addition, lithium penetration into a grain boundary may be inhibited.

A structure of a solid electrolyte according to an embodiment will be further described with reference to FIGS. 1 and 2.

A solid electrolyte 10 shown in FIG. 1 includes an inorganic lithium ion conductive film 11 and a porous layer 14 located thereon. The porous layer 14 includes a first porous layer 13 located on the surface of the solid electrolyte 10 and a second porous layer 12 located between the inorganic lithium ion conductive film 11 and the first porous layer 13. A pore size of the first porous layer 13 is greater than a pore size of the second porous layer 12. A porosity of the first porous layer 13 may be greater than a porosity of the second porous layer 12. The inorganic lithium ion conductive film 11 of the solid electrolyte 10, excluding the porous layer 14, forms a dense portion, has ionic conductivity, blocks movement of substances other than ions between a positive electrode and a negative electrode, and inhibits penetration of a lithium dendrite. In FIG. 1, an arrow indicates a thickness direction of the solid electrolyte 10.

Figure 2:
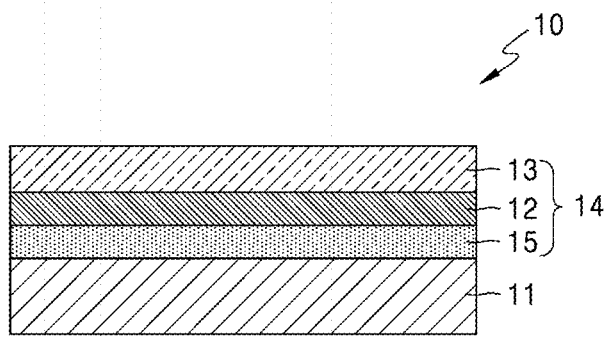
FIG. 2 is a schematic diagram illustrating another embodiment of a structure of a solid electrolyte according.

A solid electrolyte 10 of FIG. 2 is the same as the solid electrolyte 10 of FIG. 1, except that a third porous layer 15 having a smaller pore size than the pore size of the second porous layer 12 is located between the second porous layer 12 and the lithium ion conductive film 11. A pore size of the first porous layer 13 is greater than the pore size of the second porous layer 12.

A porosity of the third porous layer 15 may be adjusted to be smaller than that of the second porous layer 12 and the porosity of the second porous layer 12 may be adjusted to be smaller than that of the first porous layer 13.

The solid electrolyte 10 may have a structure in which a pore size gradually increases in the thickness direction. The porous layers of the solid electrolyte 10 of FIG. 1 and the solid electrolyte 10 of FIG. 2 have a double-layer structure and a triple-layer structure, respectively. The solid electrolyte may also have a multilayer structure including at least three layers.

In FIG. 1, the first porous layer 13 may comprise, consist essentially of, or consist of a macropore and the second porous layer 12 may comprise, consist essentially of, or consist of a micropore. As used herein, the term "macropore" refers to a pore having a diameter, or a maximum dimension such as a length or width dimension, of greater than or equal to about 10 micrometers, e.g., 10 micrometers to 1000 micrometers, and the term "micropore" refers to a pore having a diameter, or a maximum dimension such as a length or width dimension, of less than about 10 micrometers, e.g., 0.01 to 10 micrometers. Although a thickness ratio of the first porous layer 13 to the second porous layer 12 is not particularly limited, the thickness ratio may be from about 0.1:1 to about 1:1, or about 0.2:1 to about 1:1, or about 0.5:1 to about 1:1.

The first porous layer 13 may include open pores. When the first porous layer 13 includes open pores, a surface area of the solid electrolyte effectively increases, thereby improving adhesion between the solid electrolyte 10 and an electrode. The second porous layer 12 may include closed pores. When the second porous layer 12 includes closed pores, ionic conductivity of the solid electrolyte may increase.

A total thickness and density of the porous layers located on the surface of and inside of the solid electrolyte, may be selected to prevent penetration of a liquid through the solid electrolyte. In an embodiment, the porous layer has a total thickness and density such that the solid electrolyte is impermeable to a liquid. A total thickness of the porous layer may be from about 5% to about 95%, about 10% to about 90%, or about 15% to about 85%, of the total thickness of the solid electrolyte. When the percentage of the porous layer of the total thickness of the solid electrolyte is within this range, the relatively dense portion of the solid electrolyte (i.e., i) the region of the solid electrolyte proximate to the inorganic lithium ion conductive film or ii) region of the solid electrolyte excluding the porous layer) may completely prevent the penetration of a dendrite of an electrode components, e.g., lithium, and the number of ion conduction paths formed in the porous layer may increase battery capacity and increase output power.

The total thickness of solid electrolyte may be from about 10 micrometers (μm) to about 500 μm, or about 30 μm to about 400 μm, or for example, from about 40 μm to about 300 μm. The thickness of the porous layer 14 may be from about 1 μm to about 475 μm, or about 5 μm to about 250 μm, or about 10 μm to about 100 μm, or for example, from about 10 μm to about 30 μm.

The porous layer 14 of the solid electrolyte 10 shown in FIG. 1 may have an average pore size of about 0.1 μm to about 1,000 μm, for example, about 0.1 μm to about 500 μm, for example, about 1 μm to about 50 μm, or for example, about 1 μm to about 35 μm. The first porous layer 13 located on the surface of the solid electrolyte 10 may have an average pore size of about 10 μm to about 500 μm, or about 10 μm to about 100 μm, or for example, about 15 μm to about 35 μm. The second porous layer 12 located inside of the solid electrolyte 10 may have an average pore size of about 0.1 μm to about 10 μm, or about 0.5 μm to about 7.5 μm, or for example, about 1 μm to about 5 μm.

The porous layer 14 may have a total porosity of about 5% to about 70%. The first porous layer 13 located on the surface of the solid electrolyte 10 may have a porosity of about 30% to about 80%, or about 40% to about 75%, or about 50% to about 75%, and the second porous layer 12 located inside the solid electrolyte 10 may have a porosity of about 1% to about 40%, or about 1% to about 30%, or about 1% to about 25%.

The first porous layer 13 may include an open pores that is open to the outside of the porous layer 14. The first porous layer 13 may have an open porosity of about 30% or greater, or about 35% or greater, or about 40% or greater, for example, about 30% to about 90%, or about 30% to about 50%, or about 50% to about 90%. The open porosity of the first porous layer 13 refers to a percentage of the volume of open pores in the first porous layer 13 relative to the total pore volume of the first porous layer 13. When the open porosity of the first porous layer 13 is about 30% or greater, intrusion of an electrode active material into the first porous layer 13, in the case where an electrode active material layer is formed on the first porous layer 13, may be improved. As a result, a contact area between an electrode active material and the first porous layer 13 may increase, thereby further increasing battery capacity. In addition, the open porosity of the first porous layer 13 may be from about 60% to about 100%, for example, from about 70% to about 100%, or for example, from about 80% to about 100%. When the open porosity is within these ranges, the majority of the pores formed in the first porous layer 13 may be open pores.

In the solid electrolyte 10 of FIG. 2, the porous layer 14 may have an average pore size of about 0.1 μm to about 1,000 μm, for example, about 0.1 μm to about 500 μm, for example, about 1 μm to about 50 μm, or for example, about 1 μm to about 35 μm. The porous layer 14 also has a wide pore size distribution. In addition, the first porous layer 13 located on the surface of the solid electrolyte 10 may have an average pore size of about 10 μm to about 500 μm, or about 10 μm to about 300 μm, or for example, about 15 μm to about 35 μm, the second porous layer 12 located inside the solid electrolyte 10 may have an average pore size of about 0.1 μm to about 10 μm, or about 0.5 μm to about 7.5 μm, or for example, about 1 μm to about 5 μm, and the third porous layer 15 may have an average pore size of about 0.1 μm to about 5 μm, or about 0.1 μm to about 3 μm, or for example, about 0.1 μm to about 1 μm. The porous layer 14 may have a porosity of about 5% to about 60%, and the first porous layer 13 located on the surface of the solid electrolyte 10 may have a porosity of about 5% to about 80%, and the second porous layer 12 and the third porous layer 15 located inside the solid electrolyte 10 may have a porosity of about 1% to about 50% and about 1% to about 30%, respectively.

The porous layer may have an irregular or a regular porous structure. The term "irregular porous structure" refers to a structure including pores having non-uniform pore sizes and non-uniform shapes.

As used herein, the term "pore size" or "average pore size" refers to an average diameter of pores when the pores are spherical or circular. When the pores have an oval shape, the pore size refers to a length along a major axis. As used herein the term "porosity" is used to refer to a measure of the empty space (i.e., voids or pores) in a material and is determined as a percentage of the volume of voids in a material based on the total volume of the material. The pore size and porosity may be determined based on a cross-section scanning electron microscopy image or by a Brunauer, Emmett and Teller (BET) method. The open porosity may be calculated based on, for example, bulk density and sintered density as measured by the Archimedes method.

As used herein, the term "surface of the solid electrolyte" refers to an outermost surface of the solid electrolyte, which extends a distance of about 5% to about 95%, for example, about 1% to about 40%, of a total distance from the surface of the solid electrolyte to the center of the solid electrolyte, or area region within a distance of about 40 μm from the outermost edge of the solid electrolyte.

The term "inside of the solid electrolyte" refers to the portion of the solid electrolyte directly below and disposed continuously along the surface of the solid electrolyte, and corresponds to a region extending about 5% to about 100%, for example, about 60% to about 100% of a total distance from the outermost surface of the solid electrolyte, or the remaining region excluding the surface of the solid electrolyte, or excluding the region within 40 μm from the outermost edge of the solid electrolyte.

In an embodiment, the porous layer may be permeable to liquid. In an embodiment a dense portion of the solid electrolyte, i.e., the portion which is not acid-treated, is not permeable to liquid.

At least one portion of the solid electrolyte 10 of FIG. 1 may include an inorganic lithium ion conductor including a lithium ion, and a portion of the lithium ions is substituted by a proton. The first porous layer 13 located on the surface of the solid electrolyte 10 of FIG. 1 may include a first inorganic lithium ion conductor substituted with about 2% to about 100%, or about 5% to about 95%, or about 25% to about 75% of protons, and the second porous layer 12 inside of the solid electrolyte 10 may include a second inorganic lithium ion conductor substituted with about 0.01% to about 20%, or about 0.05% to about 15%, or about 0.1% to about 10%, of protons.

The porous layer 14 may be a product obtained by acid-treating an inorganic lithium ion conductive film with an acid having a concentration of greater than or equal to about 0.1 molar (M) and less than or equal to about 5 M. Alternatively, the porous layer 14 may be a product obtained by forming a multilayer film on an inorganic lithium ion conductive film and heat-treating the multilayer film. The forming may comprise coating a first composition including a pore former on a surface of the inorganic lithium ion conductive film and coating a second composition including a pore former on the first composition, wherein the amount of the pore former in the first composition is different from the amount of the pore former in the second composition.

The concentration of the acid may be 0.5 M to 5 M, for example, 0.5 M to 4.5 M, or for example, 1 M to 3 M. When the concentration of the acid is less than 0.1 M, lithium carbonate may remain in the solid electrolyte. On the contrary, when the concentration of the acid is 5 M or greater, the surface of the solid electrolyte may be damaged, making it difficult to manufacture a solid electrolyte including a porous layer having desired pore size and porosity.

By acid-treating the inorganic lithium ion conductive film or by forming the multilayer film including the pore former and heat-treating the multilayer film, a portion of the inorganic lithium ion conductor may be selectively dissolved by the acid or the pore former to form a porous structure. When the porous structure is formed as described above, lithium carbonate is removed from the solid electrolyte up to a sub-surface and a lithium ion of the lithium ion conductor may be substituted with a proton. Also, crystallinity of the solid electrolyte is improved and an average grain size is increased. As a result, formation of a metallic compound, which may cause a short circuit in the secondary battery, may be prevented and concentration of current may be inhibited thereby suppressing a short circuit at a high current density. In addition, due to the presence of the protonated inorganic lithium ion conductor and the increased specific surface area at the surface of the solid electrolyte, interfacial resistance with a lithium metal electrode may be considerably reduced.

A lattice constant (e.g., lattice distance) of the porous layer of the solid electrolyte, as measured by X-ray diffraction (XRD), is greater than a lattice constant of the remaining area of the solid electrolyte excluding the porous layer by about 0.005 angstrom (Å) to about 0.1 Å, or about 0.001 Å to about 0.1 Å, or about 0.01 Å to about 0.1 Å. The average grain size of the porous layer is at least two times greater than the average grain size of the remaining area of the solid electrolyte excluding the porous layer. The average grain size of the solid electrolyte may be, for example, from about 200 nm to about 300 nm and the lattice constant thereof may be from about 12.96 Å to about 12.98 Å. A "grain" as used herein means a particle or region of a particle having a single crystallographic orientation.

For example, the inorganic lithium ion conductive film of the solid electrolyte may include at least one of a garnet compound, an argyrodite compound, a lithium super-ion-conductor (LISICON) compound, a Na super ionic conductor-like (NASICON) compound, a Li nitride, a Li hydride, a perovskite, or a Li halide.

The inorganic lithium ion conductive film may include at least one of a garnet ceramic ($Li_{3+x}La_3M_2O_{12}$, wherein 0≤x≤5, M is at least one of W, Ta, Te, Nb, or Zr), a doped garnet ceramic ($Li_{3+x}La_3M_2O_{12}$, wherein 0≤x≤5, M is at least one of W, Ta, Te, Nb, or Zr), $Li_{1+x+y}Al_xTi_{2-x}Si_yP_{3-y}O_{12}$ (wherein 0<x<2 and 0≤y<3), $BaTiO_3$, $Pb(Zr,Ti)O_3$ (PZT), $Pb_{1-x}La_xZr_{1-y}Ti_yO_3$ (PLZT) (0≤x<1 and 0≤y<1), $Pb(Mg_{1/3}Nb_{2/3})O_3$—$PbTiO_3$ (PMN-PT), lithium phosphate ($Li_3PO_4$), lithium titanium phosphate ($Li_xTi_y(PO_4)_3$, wherein 0<x<2, and 0<y<3), lithium aluminum titanium phosphate ($Li_xAl_yTi_z(PO_4)_3$, wherein 0<x<2, 0<y<1, and 0<z<3), $Li_{1+x+y}(Al, Ga)_x(Ti,Ge)_{2-x}Si_yP_{3-y}O_{12}$ (wherein 0≤x≤1 and 0≤y≤1), lithium lanthanum titanate ($Li_xLa_yTiO_3$, wherein 0<x<2, and 0<y<3), lithium germanium thiophosphate ($Li_xGe_yP_zS_w$, wherein 0<x<4, 0<y<1, 0<z<1, and 0<w<5), lithium nitride ($Li_xN_y$, wherein 0<x<4, and 0<y<2), $SiS_2$-based glass ($Li_xSi_yS_z$, wherein 0≤x<3, 0<y<2, and 0<z<4), $P_2S_5$-based glass (wherein $Li_xP_yS_z$, 0≤x<3, 0<y<3, and 0<z<7), $Li_{3x}La_{2/3-x}TiO_3$ (0≤x≤16), $Li_7La_3Zr_2O_{12}$, $Li_{1+y}Al_yTi_{2-y}(PO_4)_3$ (0≤y≤1), $Li_{1+z}Al_zGe_{2-z}(PO_4)_3$ (wherein 0≤z≤1), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$-based ceramic, $Li_{10}GeP_2S_{12}$, $Li_{3.25}Ge_{0.25}P_{0.75}S_4$, $Li_3PS_4$, $Li_6PS_5Br$, $Li_6PS_5Cl$, $Li_7PS_5$, $Li_6PS_5I$, $Li_{1.3}Al_{0.3}Ti_{1.7}(PO_4)_3$, $LiTi_2(PO_4)_3$, $LiGe_2(PO_4)_3$, $LiHf_2(PO_4)_3$, $LiZr_2(PO_4)_3$, $Li_2NH$, $Li_3(NH_2)_2I$, $LiBH_4$, $LiAlH_4$, $LiNH_2$, $Li_{0.34}La_{0.51}TiO_{2.94}$, $LiSr_2Ti_2NbO_9$, $Li_{0.06}La_{0.66}Ti_{0.93}Al_{0.03}O_3$, $Li_{0.34}Nd_{0.55}TiO_3$, $Li_2CdCl_4$, $Li_2MgCl_4$, $Li_2ZnI_4$, $Li_2CdI_4$, $Li_{4.9}Ga_{0.5+δ}La_3Zr_{1.7}W_{0.3}O_{12}$ (wherein 0≤δ<1.6), $Li_{4.9}Ga_{0.5+δ}La_3Zr_{1.7}W_{0.3}O_{12}$ (wherein 1.7≤δ≤2.5), and $Li_{5.39}Ga_{0.5+δ}La_3Zr_{1.7}W_{0.3}O_{12}$ (wherein 0≤δ<1.11).

In the doped Garnet ceramics $Li_{3+x}La_3M_2O_{12}$, a doping element includes Ce, Pr, Ga, Y or a combination thereof.

The inorganic lithium ion conductive film may include, for example, at least one compound represented by the Formula 1 or 1a.

$$Li_{7-x}M^1_xLa_{3-a}M^2_aZr_{2-b}M^3_bO_{12} \qquad \text{Formula 1}$$

$$Li_{7-x}La_{3-a}M^2_aZr_{2-b}M^3_bO_{12} \qquad \text{Formula 1a}$$

wherein, in Formula 1, $M^1$ comprises at least one of gallium (Ga) or aluminum (Al), in Formulas 1 and 1a, $M^2$ comprises at least one of calcium (Ca), strontium (Sr), cesium (Cs), or barium (Ba), $M^3$ includes at least one of aluminum (Al), tungsten (W), niobium (Nb), or tantalum (Ta), and 0≤x<3, 0≤a≤3, and 0≤b<2.

In Formula 1, x may be from 0.01 to 2.1, for example, 0.01 to 0.99, for example, from 0.1 to 0.9, and from 0.2 to 0.8. In Formula 1, a may be from 0.1 to 2.8, for example, 0.5 to 2.75, and b may be from 0.1 to 1, for example, 0.25 to 0.5.

In the compound represented by the Formula 1, a dopant may be at least one of $M^1$, $M^2$, or $M^3$. In the compound represented by the Formula 1a, a dopant may be at least one of $M^2$ or $M^3$.

The inorganic lithium ion conductive film may include, for example, at least one of $Li_7La_3Zr_2O_{12}$ (LLZO), $Li_{6.4}La_3Zr_{1.7}W_{0.3}O_{12}$, $Li_{6.5}La_3Zr_{1.5}Ta_{0.3}O_{12}$, $Li_7La_3Zr_{1.7}W_{0.3}O_{12}$, $Li_{4.9}La_{2.5}Ca_{0.5}Zr_{1.7}Nb_{0.3}O_{12}$, $Li_{4.9}Ga_{2.1}La_3Zr_{1.7}W_{0.3}O_{12}$, $Li_7La_3Zr_{1.5}W_{0.5}O_{12}$, $Li_7La_{2.75}Ca_{0.25}Zr_{1.75}Nb_{0.25}O_{12}$, $Li_7LaZr_{1.5}Nb_{0.5}O_{12}$, $Li_7LaZr_{1.5}Ta_{0.5}O_{12}$, $Li_{6.272}La_3Zr_{1.7}W_{0.3}O_{12}$, or $Li_{5.39}Ga_{1.61}La_3Zr_{1.7}W_{0.3}O_{12}$. In the inorganic lithium ion conductive film, the inorganic lithium ion conductor may have a particle structure or a columnar structure. In the porous layer, a lithium ion of the inorganic lithium ion conductor may be substituted with a proton such that an amount of protons in the porous layer may be from about 0.01 mole percent (mol %) to about 50 mol %, or about 0.1 mol % to about 30 mol %, or for example, about 0.1 mol % to about 20 mol %, of the total number of protons and lithium ions.

The surface of the solid electrolyte may include $Li_{7-x}H_xLa_3Zr_{2-y}M_yO_{12}$ (wherein 0.1≤x≤7, 0≤y≤2, and M is at least one of W, Ta, Te, or Nb) and the inside of the solid electrolyte may include $Li_{7-x}H_xLa_3Zr_{2-y}M_yO_{12}$ (wherein 0≤x≤6.5, 0≤y≤2, and M is at least one of W, Ta, Te, or Nb).

The surface of the solid electrolyte may include a lithium ion conductor substituted with $Li_{(7-x)}H_xLa_3Zr_2O_{12}$ (wherein 0.1≤x≤7), and the inside of the solid electrolyte may include $Li_{(7-x)}H_xLa_3Zr_2O_{12}$ (wherein 0≤x<6.5).

The surface of the solid electrolyte may include a lithium ion conductor substituted with $Li_{(6.75-x)}H_xLa_{2.9}Ga_{0.1}Nb_{0.25}Zr_{1.75}O_{12}$ (wherein 0.1≤x<6.75) and the inside thereof may include $Li_{(7-x)}H_xLa_3Zr_2O_{12}$ (wherein 0≤x<6.5). In this case, in the solid electrolyte, portions of an inorganic lithium ion conductive film on which the porous layer is not formed may include $Li_{6.75}La_{2.9}Ga_{0.1}Nb_{0.25}Zr_{1.75}O_{12}$.

In the inorganic lithium ion conductive film, a grain of the inorganic lithium ion conductor may have a polyhedral shape. In the case of a grain having a polyhedral shape, the contact area between adjacent grains may increase, thereby increasing ion conductivity and increasing the possibility of contact between an active material and a crystal plane efficient for a charge transfer reaction, thereby increasing the kinetics of an electrochemical reaction.

A secondary battery according to another embodiment includes a positive electrode, a negative electrode, and a solid electrolyte interposed between the positive electrode and the negative electrode.

Figure 3:
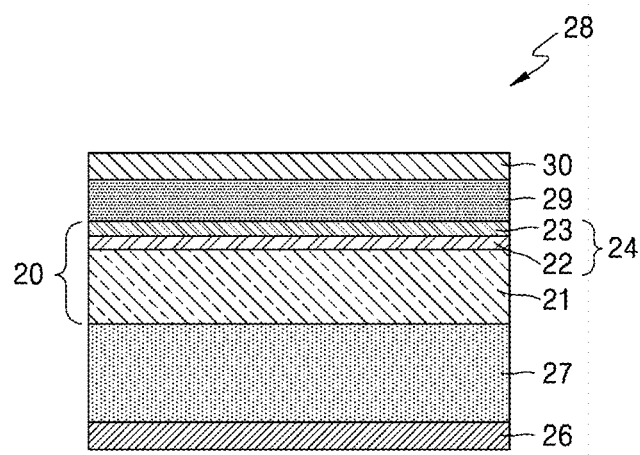
FIG. 3 is a schematic diagram illustrating an embodiment of a structure of a secondary battery.

Referring to FIG. 3, a secondary battery according to an embodiment will be described in more detail.

In a secondary battery 28, a positive electrode 27 is located on a positive current collector 26, and a solid electrolyte 20 is located on the positive electrode 27. A solid electrolyte 20 shown in FIG. 3 includes an inorganic lithium ion conductive film 21 and a porous layer 24 located thereon. The porous layer 24 of the solid electrolyte 20 is arranged to be adjacent to a negative electrode 29. A negative current collector 30 is disposed (e.g., laminated) on the negative electrode 29.

In the porous layer 24, a first porous layer 23 is located on the surface of the solid electrolyte 20 and a second porous layer 22 having a smaller pore size than that of the first porous layer 23 is located inside of the solid electrolyte 20. An electrolyte may be located between the positive electrode 27 and the solid electrolyte 20. The electrolyte may include at least one of an ionic liquid, a lithium salt, an organic solvent, or a polymer ionic liquid. The electrolyte may be impregnated in the positive electrode 27.

The ionic liquid, is an ionic material in a molten state at room temperature (25° C.), and may be any material including a cation and an anion without limitation. Examples of the ionic liquid may include at least one compound including at least one cation and at least one anion. The at least one cation may include at least one of ammonium, pyrrolidium, pyridinium, pyrimidium, imidazolium, piperidinium, pyrazolium, oxazolium, pyridazinium, phosphonium, sulfonium, or triazolium. The at least one anion may include at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FS-O_2)_2N^-$, $(C_2F_5SO_2)_2N^-$, $(C_2F_5SO_2)(CF_3SO_2)N^-$, or $(CF_3SO_2)_2N^-$.

For example, the ionic liquid may be at least one of [emim]C/AlCl$_3$ (emim is ethyl methyl imidazolium), [bmpyr]NTf2 (bmpyr is butyl methyl pyridinium), [bpy]Br/AlC$_3$ (bpy=4,4'-bipyridine), [choline]Cl/CrCl$_3$.6H$_2$O, [emim]OTf/[hmim]I (hmim is hexyl methyl imidazolium), [choline]Cl/HOCH$_2$CH$_2$OH, [Et$_2$MeN(CH$_2$CH$_2$OMe)]BF$_4$ (Et is ethyl, Me is methyl, Pr is propyl, Bu is butyl, Ph is phenyl, Oct is octyl, Hex is hexyl), [Bu$_3$PCH$_2$CH$_2$C$_8$F$_{17}$]OTf (OTf is trifluoromethane sulfonate), [bmim]PF$_6$ (bmim is butyl methyl imidazolium), [bmim]BF$_4$, [omim]PF$_6$ (omim is octyl methyl imidazolium), [Oct$_3$PC$_{18}$H$_{37}$]I, [NC(CH$_2$)$_3$mim]NTf$_2$ (mim is methyl imidazolium), [Pr$_4$N][B(CN)$_4$], [bmim]NTf$_2$, [bmim]Cl, [bmim][Me(OCH$_2$CH$_2$)$_2$OSO$_3$], [PhCH$_2$mim]OTf, [Me$_3$NCH(Me)CH(OH)Ph]NTf$_2$, [pmim][(HO)$_2$PO$_2$] (pmim is propyl methyl imidazolium), [(6-Me)bquin]NTf$_2$ (bquin is butyl quinolinium, [bmim][Cu$_2$Cl$_3$], [C$_{18}$H$_{37}$OCH$_2$mim]BF$_4$ (mim is methyl imidazolium), [heim]PFe (heim is hexyl ethyl imidazolium), [mim(CH$_2$CH$_2$O)$_2$CH$_2$CH$_2$mim][NTf$_2$]$_2$ (mim is methyl imidazolium), [obim]PF$_6$ (obim is octyl butyl imidazolium), [oquin]NTf$_2$ (oquin is octyl quinolinium), [hmim][PF$_3$(C$_2$F$_5$)$_3$], [C$_{14}$H$_{29}$mim]Br (mim is methyl imidazolium), [Me$_2$N(C$_{12}$H$_{25}$)$_2$]NO$_3$, [emim]BF$_4$, [MeN(CH$_2$CH$_2$OH)$_3$], [MeOSO$_3$], [Hex$_3$PC$_{14}$H$_{29}$]NTf$_2$, [emim][EtOSO$_3$], [choline][ibuprofenate], [emim]NTf$_2$, [emim][(EtO)$_2$PO$_2$], [emim]Cl/CrCl$_2$, [Hex$_3$PC$_{14}$H$_{29}$]N(CN)$_2$, and the like. However, the ionic liquid is not limited thereto and any suitable ionic liquid may also be used therefor.

Unless specified otherwise, mim is methyl imidazolium, emim is ethyl methyl imidazolium, hmim is hexyl methyl imidazolium, obim is octyl butyl imidazolium, bmim is butyl methyl imidazolium, omim is octyl methyl imidazolium, pmim is propyl methyl imidazolium, bppyr is butyl methyl pyridinium, bpy is 4,4'-bipyridine, Et is ethyl, Me is methyl, Pr is propyl, Bu is butyl, Ph is phenyl, Oct is octyl, Hex is hexyl, py is pyridine, obim is octyl butyl imidazolium, bquin is butyl quinolinium, heim is hexyl ethyl imidazolium, oquin is octyl quinolinium, OTf is trifluoromethane sulfonate, and NTf$_2$ is bis(trifluoromethanesulfonyl) imide.

The lithium salt may include at least one of LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_a$, LiPF$_3$(CF$_3$)$_3$, or LiB(C$_2$O$_4$)$_2$. In addition, a concentration of the lithium salt is from about 1 M to about 6 M, or for example, from about 1.5 M to about 5 M.

The negative electrode 29 may be a lithium metal negative electrode.

The solid electrolyte 20 and the negative electrode 29 may be bonded to each other by a method known to those of skill in the art. For example, the solid electrolyte and the negative electrode may be bonded to each other by cold isostatic pressing (CIP). According to another embodiment, the solid electrolyte 20 and the negative electrode 29 may be bonded via a molten Li or a polyethylene oxide binder.

The secondary battery 28 may further include at least one of a liquid electrolyte, a polymer electrolyte, or a lithium salt.

The liquid electrolyte may include a lithium salt and an organic solvent.

The organic solvent may include an aprotic solvent or protic solvent. Examples of the aprotic solvent may include carbonate-based, ester-based, ether-based, or ketone-based solvents. The protic solvent may be include alcohol-based solvents. Examples of the carbonate-based solvent may include dimethyl carbonate (DMC), diethyl carbonate (DEC), ethyl methyl carbonate (EMC), dipropyl carbonate (DPC), methyl propyl carbonate (MPC), ethyl propyl carbonate (EPC), ethylene carbonate (EC), propylene carbonate (PC), and butylene carbonate (BC). Examples of the ester-based solvents may include methyl acetate, ethyl acetate, n-propyl acetate, t-butyl acetate, methyl propionate, ethyl propionate, γ-butyrolactone, decanolide, valerolactone, mevalonolactone, and caprolactone. Examples of the ether-based solvents may include dibutyl ether, tetraglyme, diglyme, dimethoxyethane, 2-methyltetrahydrofuran, tetrahydrofuran, and tetraethylene glycol dimethyl ether (TEGDME). Examples of the ketone-based solvent may include cyclohexanone. Also, examples of the alcohol-based solvent may include ethyl alcohol and isopropyl alcohol. However, examples of the aprotic solvent are not limited thereto, and any material available as an aprotic solvent in the art may also be used.

The polymer electrolyte may be any polymer electrolyte suitable for use in a secondary battery.

A solid sulfide electrolyte may further be located between the negative electrode and the solid electrolyte. For example, the solid sulfide electrolyte may be Li$_2$S—P$_2$S$_5$—LiX (wherein X is at least one of F, Cl, Br, or I).

The secondary battery may be configured to operate at a current density of 3 milliamperes per square centimeter (mA/cm$^2$) over 1,000 cycles, for example, over 1,700 cycles.

A lifespan of the secondary battery is greater than 1,700 cycles when the secondary battery has a capacity of 80% of an initial capacity.

The negative electrode may be a lithium metal electrode or a lithium metal alloy electrode. A surface of the solid electrolyte in contact with the negative electrode has a greater pore size than a portion of the solid electrolyte furthest away from the negative electrode.

The secondary battery may be a lithium metal battery including a negative electrode including at least one of a lithium metal or a lithium metal alloy.

In a lithium metal battery including a lithium metal negative electrode, the solid electrolyte according to an embodiment may serve as a protective layer to protect the lithium metal negative electrode. The solid electrolyte according to an embodiment and a lithium metal negative electrode together may constitute a protective negative electrode.

Hereinafter, a method of preparing a secondary battery according to an embodiment will be described.

A positive electrode is prepared according to the following method.

A positive active material, a binder, and a solvent are mixed to prepare a positive active material composition.

A conductive agent may further be added to the positive active material composition.

The positive active material composition may be directly coated on a metal current collector and dried to prepare a positive electrode plate. Alternatively, the positive active material composition may be cast on a separate support, and then a film separated from the support may be laminated on a metal current collector to prepare a positive electrode plate.

The binder facilitates the binding of the positive active material to the conductive agent, the current collector, and the like. Examples of the binder may include, but are not limited to, at least one of polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber (SBR), fluorine rubber, or a copolymer thereof.

The conductive agent may be any compound having electrical conductivity without causing a chemical change. For example, the conductive agent may be at least one of graphite such as natural graphite and artificial graphite; a carbonaceous material such as carbon black, acetylene black, Ketjen black, channel black, furnace black, lamp black, and thermal black; a conductive fiber such as carbon fiber and metal fiber; carbon fluoride; metal powder such as aluminum powder and nickel powder; conductive whisker such as zinc oxide and potassium titanate; conductive metal oxide such as titanium oxide; or conductive materials such as polyphenylene derivatives may be used as the conductive agent. A combination comprising at least one of the foregoing may also be used.

The solvent may be N-methylpyrrolidone (NMP), without being limited thereto.

Amounts of the positive active material, the conductive agent, the binder, and the solvent may be determined by those of skill in the art without undue experimentation. At least one of the conductive agent, the binder, or the solvent may not be used according to the use and the structure of the lithium battery.

The positive active material used to prepare the positive electrode may include at least one of lithium cobalt oxide, lithium nickel cobalt manganese oxide, lithium nickel cobalt aluminum oxide, lithium iron phosphate, or lithium manganese oxide, without being limited thereto, and, any suitable positive active material may also be used.

For example, the positive active material may include at least one of the following: $Li_aA_{1-b}B'_bD_2$ (where $0.90 \leq a \leq 1.8$ and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aN_{i_b}E_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); or $LiFePO_4$.

In these formulae above, A is nickel (Ni), cobalt (Co), manganese (Mn), or any combination thereof; B' is aluminum (Al), nickel (Ni), cobalt (Co), manganese (Mn), chromium (Cr), iron (Fe), magnesium (Mg), strontium (Sr), vanadium (V), a rare earth element or any combination thereof; D is oxygen (O), fluorine (F), sulfur (S), phosphorus (P), or any combination thereof; E is cobalt (Co), manganese (Mn), or any combination thereof; F' is fluorine (F), sulfur (S), phosphorus (P), or any combination thereof; G is aluminum (Al), chromium (Cr), manganese (Mn), iron (Fe), magnesium (Mg), lanthanum (La), cerium (Ce), strontium (Sr), vanadium (V), or any combination thereof; Q is titanium (Ti), molybdenum (Mo), manganese (Mn), or any combination thereof; I' is chromium (Cr), vanadium (V), iron (Fe), scandium (Sc), yttrium (Y), or any combination thereof; and J is vanadium (V), chromium (Cr), manganese (Mn), cobalt (Co), nickel (Ni), copper (Cu), or any combination thereof.

For example, the positive active material may be at least one of the compounds represented by Formulae 1, 2, or 3 below.

$$Li_aNi_bCo_cMn_dO_2 \quad \text{Formula 1}$$

In Formula 1, $0.90 \leq a \leq 1.8$, $0 \leq b \leq 0.95$, $0 \leq c \leq 0.5$, and $0 \leq d \leq 0.5$.

$$Li_2MnO_3 \quad \text{Formula 2}$$

$$LiMO_2 \quad \text{Formula 3}$$

In Formula 3, M is Mn, Fe, Co, or Ni.

The lithium secondary battery may further include at least one of a liquid electrolyte, a solid electrolyte, a gel electrolyte, or a polymer ionic liquid.

The negative electrode may be a lithium metal negative electrode including at least one of a lithium metal or a lithium metal alloy or may include a negative active material including at least one of a carbonaceous material, silicon, silicon oxide, a silicon alloy, a silicon-carbon composite, tin, a tin alloy, a tin-carbon composite, a metal/metalloid alloyable with lithium, an alloy thereof, or an oxide thereof.

The negative electrode may be at least one of a lithium metal thin film or a lithium metal alloy thin film.

The lithium metal alloy may include Li and a metal/metalloid alloyable with Li. For example, the metal/metalloid alloyable with Li may be Si, Sn, Al, Ge, Pb, Bi, Sb, an Si—Y' alloy (Y' is at least one of an alkali metal, an alkali earth metal, a Group 13 to 16 element, a transition metal, a rare earth element, except for Si), an Sn—Y' alloy (Y' is at least one of an alkali metal, an alkali earth metal, a Group 13 to 16 element, a transition metal, or a rare earth element, except for Sn). In this regard, Y' may be at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, or Po.

The solid electrolyte according to an embodiment is located on the negative electrode.

A secondary battery may be prepared by accommodating the positive electrode in a battery case, injecting an electrolyte thereinto, and locating the positive electrode on one surface of the solid electrolyte, the other surface of which is mounted with the negative electrode.

The electrolyte may include at least one of a lithium salt, an ionic liquid, a polymer ionic liquid, or an organic solvent. For example, the electrolyte includes a lithium salt and an ionic liquid.

The secondary battery may be, for example, a lithium secondary battery in which a lithium electrode is used as a negative electrode, a lithium air battery in which a lithium electrode is used as a negative electrode and oxygen is used as a positive electrode, a lithium sulfur battery in which a lithium electrode is used as a negative electrode and a positive electrode includes sulfur or a sulfur-containing active material, or the like.

The secondary battery according to an embodiment may include at least one of sodium, magnesium, calcium, or aluminum in addition to lithium as a material used to form the negative electrode.

The secondary battery including the solid electrolyte according to an embodiment may be, for example, an all-solid-state secondary battery or a lithium ion secondary battery.

Surface structures and components of the solid electrolyte according to an embodiment may be analyzed by X-ray diffraction (XRD), scanning electron microscopy (SEM), transmission electron microscopy (TEM), inductively coupled plasma (ICP) analysis, X-ray photoelectron spectroscopy (XPS), or the like.

A method of preparing the solid electrolyte according to another embodiment includes acid-treating an inorganic lithium ion conductive film by applying an acid having a concentration of greater than or equal to about 0.1 M and less than 5 M thereto; and cleaning an acid-treated product. In particular, the method includes a first acid treatment comprising acid-treating an inorganic lithium ion conductive film with an acid having a concentration of greater than or equal to about 0.1 molar and less than or equal to about 5 molar to provide a first acid-treated product, and a first cleaning comprising cleaning the first acid-treated product to provide a cleaned first acid-treated product forming the solid electrolyte.

The acid treatment may be performed by dipping a portion of the inorganic lithium ion conductive film in the acid or by disposing a mask on the inorganic lithium ion conductive film and coating the acid only on exposed portion of the inorganic lithium ion conductive film.

Acid treatment time may vary in accordance with the concentration of the acid and may be, for example, from about 0.1 hour to about 2 hours. Also, the acid treatment is performed under dry-air conditions (e.g., a relative humidity of 0%) to minimize a reaction between the surface of the solid electrolyte and moisture in the air.

The pore size, porosity, and thickness of the porous layer of the solid electrolyte may vary in accordance with the concentration of the acid during the acid treatment and acid treatment time.

In a portion of the acid-treated surface, or all of the acid treated surface, of the solid electrolyte (e.g., $Li_7La_3Zr_2O_{12}$ layer), a lithium ion is substituted with a proton and thus lithium carbonate is removed from the surface as shown in Reaction Scheme 1 below.

Reaction Scheme 1

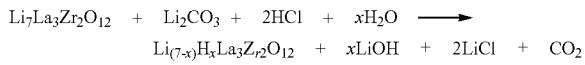

$$Li_7La_3Zr_2O_{12} + Li_2CO_3 + 2HCl + xH_2O \longrightarrow$$
$$Li_{(7-x)}H_xLa_3Zr_2O_{12} + xLiOH + 2LiCl + CO_2$$

In Reaction Scheme 1, $0<x\leq 7$.

When the portion of the solid electrolyte substituted with a proton is in contact with an acid over a predetermined period of time, dissolution of the solid electrolyte may occur by decomposition of the solid electrolyte. In this dissolution, a grain having a smaller size and a relatively high energy state is dissolved selectively from grain boundaries at the surface of the electrolyte layer. Since pores are formed in positions where the grain having a small size is completely dissolved, a porous layer is formed on the surface of the solid electrolyte. Thickness, porosity, and pore size of the porous layers located on the surface of the solid electrolyte and inside of the solid electrolyte may be adjusted by varying the acid treatment conditions, for example, the concentration of the acid and acid treatment time.

The cleaning may be performed by using, for example, ethanol.

The inorganic lithium ion conductive film may be prepared by combining an inorganic lithium ion conductor and a lithium compound to prepare a mixture, and heat-treating the mixture.

An inorganic lithium ion conductor is prepared by a solid phase method or liquid phase method by using a precursor for forming the inorganic lithium ion conductor. The inorganic lithium ion conductor and a lithium compound are combined to prepare a mixture and the mixture is processed in the form of pellets, sheets, or films. The product in the form of pellets or sheets is heat-treated. A heat treatment temperature may vary in accordance with type and amount of the inorganic lithium ion conductor and the lithium compound and may be, for example, from about 25° C. to about 80° C.

The heat-treated product is polished to remove impurities remaining on the surface or generated during heat treatment. The polishing may be performed by using an auto polisher.

The lithium compound is a material capable of supplying lithium to the inorganic lithium ion conductor. Examples of the lithium compound may include at least one of lithium carbonate, lithium hydroxide, or lithium oxide. The amount of the lithium compound is in the range of about 0.1 parts by weight to about 10 parts by weight, for example, about 1 part by weight to about 8 parts by weight, or for example, about 3 parts by weight to about 5 parts by weight based on 100 parts by weight, based on a total weight of the inorganic lithium ion conductor and the lithium compound. When the amount of the lithium compound is within the above ranges, a solid electrolyte including a porous layer having desired pore size and porosity may be obtained. By adding an excess of the lithium compound during the preparation of the solid electrolyte, a porous layer having a predetermined thickness may be formed without structural collapse during acid treatment with a strong acid.

The method further includes a second acid treatment comprising acid-treating the cleaned first acid-treated product with an acid having a concentration of greater than or equal to about 0.1 molar and less than or equal to about 5 molar to provide a second acid-treated product, and a second cleaning comprising cleaning the second acid-treated product. For example, a second acid treatment is performed by applying an acid having a concentration of more than 0.1 M and less than 5 M thereto and a second cleaning process of cleaning a product obtained by the second acid treatment may be repeatedly performed.

The concentration of the acid used in the second acid treatment is less than the concentration of the acid used in the previous (e.g., first) acid treatment.

The cleaned product is dried. The drying is performed, for example, at about 25° C. to about 60° C.

The acid may include at least one of HCl, $H_3PO_4$, $HNO_3$, $H_2SO_4$, or acetic acid, but is not limited thereto.

A method of preparing the solid electrolyte according to another embodiment includes: forming a multilayer film on a surface of an inorganic lithium ion conductive film, the forming including coating a first composition comprising a pore former and a lithium ion conductor on a surface of the inorganic lithium ion conductive film, and drying the first composition, and coating a second composition comprising a pore former and a lithium ion conductor on the dried first composition, and drying the second composition to form the multilayer film; and heat-treating the multilayer film. The amount of the pore former in the first composition may be different from the amount of the pore formed in the second composition.

The pore former may be any material capable of forming pores in the multilayer. Examples of the pore former may include at least one of dibutyl phthalate, dimethyl phthalate, diethyl phthalate, dioctyl sebacate, or dioctyl adipate.

Hereinafter, one or more embodiments will be described in detail with reference to the following examples and comparative examples. However, these examples and comparative examples are not intended to limit the purpose and scope of the one or more embodiments.

Examples

Preparation Example 1: Preparation of LLZO Film $Li_7La_3Zr_2O_{12}$ (LLZO) powder was obtained by a solid phase method. The $Li_7La_3Zr_2O_{12}$ (LLZO) powder was prepared in the same manner as described in Example 1 of US Patent Application Publication No. 2016/0149260, incorporated herein by reference in its entirety, except that $Li_2CO_3$, LiOH, $La_2O_3$, and $ZrO_2$ were used as oxide precursors.

The $Li_7La_3Zr_2O_{12}$ (LLZO) powder and lithium carbonate ($Li_2CO_3$) were uniaxially pressed at a pressure of about 10 millipascals (MPa) to form a layer. An amount of the lithium carbonate was 5.5 parts by weight based on 100 parts by weight of a total weight of the $Li_7La_3Zr_2O_{12}$ (LLZO) powder and the lithium carbonate ($Li_2CO_3$).

Next, the layer was covered with mother powder ($Li^7La_3Zr_2O_{12}$) and heat-treated at 1300° C. for 4 hours. A surface of the heat-treated layer was polished using an auto polisher to prepare an LLZO Film (thickness: about 300 µm).

Preparation Example 2: Preparation of LLZO Film

An LLZO film was prepared in the same manner as in Preparation Example 1, except that $Li_{6.4}La_3Zr_{1.7}W_{0.3}O_{12}$ (W-doped LLZO) powder was used instead of the $Li_7La_3Zr_2O_{12}$ (LLZO) powder.

Preparation Example 3: Preparation of LLZO Film

An LLZO film was prepared in the same manner as in Preparation Example 1, except that $Li_{6.5}La_3Zr_{1.5}Ta_{0.3}O_{12}$ (Ta-doped LLZO) powder was used instead of the $Li_7La_3Zr_2O_{12}$ (LLZO) powder.

Preparation Examples 4 and 4a: Preparation of LLZO Film

LLZO films were prepared in the same manner as in Preparation Example 1, except that lithium carbonate was used in amounts of 0.1 parts by weight and 10 parts by weight based on 100 parts by weight of the total weight of $Li_7La_3Zr_2O_{12}$ (LLZO) powder and lithium carbonate ($Li_2CO_3$).

Preparation Example 5: Preparation of LLZO Film

An LLZO film was prepared in the same manner as in Preparation Example 1, except that lithium hydroxide was used instead of the lithium carbonate during the process of uniaxial pressing, and the uniaxial pressing of the $Li_7La_3Zr_2O_{12}$ (LLZO) powder and lithium hydroxide was conducted at a pressure of about 200 MPa.

Comparative Preparation Example 1: Preparation of LLZO Film

An LLZO film was prepared in the same manner as in Preparation Example 1, except that lithium carbonate ($Li_2CO_3$) was not added to the $Li_7La_3Zr_2O_{12}$ (LLZO) powder during the process of uniaxial pressing of the $Li_7La_3Zr_2O_{12}$ (LLZO) powder at a pressure of about 10 MPa.

Comparative Preparation Example 1-1

An LLZO film was prepared according to the following method described in Energy Environ. Sci., 2017, 1568-1575, page 1573, incorporated herein by reference in its entirety.

LLZO powder and poly(methylmethacrylate) (PMMA), as a pore former, were added to a mixed solvent of toluene and isopropanol, and the mixture was mixed for about 1 hour to prepare a porous layer slurry. Fish oil, polyvinyl butyral, and butyl benzyl phthalate (BBP) were added to the porous layer slurry as a binder and dispersant. The porous layer slurry was coated on surfaces of $Li_7La_3Zr_2O_{12}$ (LLZO) pellets by screen printing and heat-treated at about 1100° C. for 2 hours to prepare a porous LLZO film.

Example 1: Preparation of Solid Electrolyte

A mask was placed on a surface of the LLZO film prepared according to Preparation Example 1 and a first acid treatment was performed on the LLZO film for 10 minutes by dropping a 1 M HCl aqueous solution on exposed portions of the LLZO film. A product obtained by the first acid treatment was cleaned using ethanol and dried to form a porous layer on a surface of the LLZO film. The acid treatment and cleaning were sequentially repeated two more times to perform second acid treatment and third acid treatment, thereby increasing a porosity and a thickness of the porous layer. The concentration of the acid and the acid treatment time of the second and third acid treatments were the same as those of the first acid treatment. The acid treatments were performed under dry-air conditions (e.g., a relative humidity of 0%) to minimize reaction between the surface of the solid electrolyte and moisture in the air. A resultant product obtained after cleaning was dried at about 25° C. to prepare a solid electrolyte.

Example 2 and Comparative Example 1: Preparation of Solid Electrolyte

Solid electrolytes were prepared in the same manner as described in Example 1, except that the concentration of acid and the acid treatment time were varied for each of the first, second, and third acid treatments as shown in Table 1 below.

TABLE 1

| | Concentration of Acid (M) | Acid treatment time (min) |
|---|---|---|
| Example 2-1 | 0.5 | First acid treatment: 10 min<br>Second acid treatment: 10 min<br>Third acid treatment: 10 min |
| Example 2-2 | 2 | First acid treatment: 10 min<br>Second acid treatment: 10 min<br>Third acid treatment: 10 min |
| Example 2-3 | 4 | First acid treatment: 10 min<br>Second acid treatment: 10 min<br>Third acid treatment: 10 min |
| Comparative Example 1-1 | 5 | First acid treatment: 10 min<br>Second acid treatment: 10 min<br>Third acid treatment: 10 min |
| Comparative Example 1-2 | 0.1M | First acid treatment: 10 min<br>Second acid treatment: 10 min<br>Third acid treatment: 10 min |
| Comparative Example 1-3 | 0.01M | First acid treatment: 10 min<br>Second acid treatment: 10 min<br>Third acid treatment: 10 min |
| Comparative Example 1-4 | 5M HCl | 30 min |

Example 3: Preparation of Solid Electrolyte

Solid electrolytes were prepared in the same manner as described in Example 1, except that the concentration of acid and acid treatment time used in first to third acid treatments were varied as shown in Table 2 below. When the acid treatment is performed while gradually reducing the concentration of the acid, as shown in Table 2, particle connections in the porous layer are well maintained.

TABLE 2

| | First acid treatment | | Second acid treatment | | Third acid treatment | |
|---|---|---|---|---|---|---|
| | Acid Concentration (M) | Acid Treatment Time (min) | Acid Concentration (M) | Acid Treatment Time (min) | Acid Concentration (M) | Acid Treatment Time (min) |
| Example 3-1 | 4 | 10 | 2 | 10 | 1 | 10 |
| Example 3-2 | 2 | 10 | 1 | 10 | 0.5 | 10 |
| Example 3-3 | 1 | 10 | 0.5 | 10 | 0.1 | 10 |

Example 5: Preparation of Solid Electrolyte

A solid electrolyte was prepared in the same manner as in Example 2, except that the acid treatment was performed on both surfaces of the LLZO film.

The acid treatment performed on both surfaces of the LLZO film includes immersing the LLZO film in a 1 M HCl aqueous solution for about 10 minutes, cleaning the film using ethanol, and drying the resultant.

Examples 6 and 7: Preparation of Solid Electrolyte

Solid electrolytes were prepared in the same manner as in Example 1, except that the LLZO films of Preparation Example 2 and of Preparation Example 3 were respectively used instead of the LLZO film of Preparation Example 1.

Example 7a: Preparation of Solid Electrolyte

A solid electrolyte was prepared in the same manner as in Example 1, except that the LLZO film of Preparation Example 5 was used instead of the LLZO film of Preparation Example 1.

Comparative Example 2: Preparation of Solid Electrolyte

A solid electrolyte was prepared in the same manner as in Example 1, except that the LLZO film prepared according to Comparative Preparation Example 1 was used instead of the LLZO film prepared according to Preparation Example 1.

Example 8: Preparation of Lithium Secondary Battery

First, a positive electrode was prepared according to the following method.

$LiNi_{0.33}Co_{0.33}Mn_{0.33}O_2$(NCM), polyvinylidene fluoride (PVDF), Super P as a conductive agent, and N-methylpyrrolidone were mixed to obtain a positive active material layer forming composition. In the positive active material layer forming composition, a weight ratio of NCM to Super P to PVDF was 97:1.5:1.5. An amount of N-methylpyrrolidone was about 137 grams (g) when an amount of NCM was 97 g.

The positive active material layer forming composition was coated on an Al foil (thickness: about 15 μm) and dried at 25° C., and the dried resultant was further dried in a vacuum at about 110° C. to prepare a positive electrode.

A lithium metal negative electrode (thickness: about 20 μm) was disposed on a current collector (Cu foil) and the lithium metal negative electrode and a solid electrolyte were bonded by applying a pressure of about 250 MPa by using a cold isostatic pressing (CIP) method.

The positive electrode prepared as described above was placed in a stainless battery case and a positive electrolyte was added thereto. Then, the positive electrode was disposed on a surface of the solid electrolyte prepared according to Example 1, the other surface of which is mounted with the lithium metal negative electrode (thickness: 20 μm) to prepare a lithium secondary battery (refer to FIG. 3).

The positive electrolyte was a 2 M LiFSI ionic liquid prepared by mixing LiFSI, as a lithium salt, and N-methyl-N-propyl pyrrolidinium bis(fluorosulfonyl) imide (Pyr13FSI, $PYR_{13}+$ cation structure) having the structure shown below), as an ionic liquid.

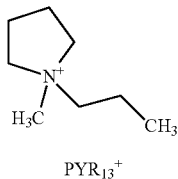

$PYR_{13}^+$

Example 9 to 11: Preparation of Lithium Secondary Battery

Lithium secondary batteries were prepared in the same manner as in Example 8, except that the solid electrolytes prepared according to Examples 6, 7, and 7a were used instead of the solid electrolyte of Example 1.

Comparative Example 3: Preparation of Lithium Secondary Battery

A lithium secondary battery was prepared in the same manner as in Example 8, except that the LLZO film prepared according to Preparation Example 1 was used instead of the solid electrolyte of Example 1.

Comparative Example 4: Preparation of Lithium Secondary Battery

A lithium secondary battery was prepared in the same manner as in Example 8, except that the solid electrolyte was prepared according to Comparative Preparation Example 1-1, prepared as described with reference to "Garnet solid-state electrolyte preparation," Energy Environ. Sci., 2017, 1568-1575, page 1573, incorporated herein by reference in its entirety, was used instead of the solid electrolyte of Example 1.

Comparative Example 5: Preparation of Lithium Secondary Battery

A lithium secondary battery was prepared in the same manner as in Example 8, except that the solid electrolyte of Comparative Example 2 was used instead of the solid electrolyte of Example 1.

Comparative Examples 6 and 7: Preparation of Lithium Secondary Battery

Lithium secondary batteries were prepared in the same manner as in Example 8, except that the solid electrolytes prepared according to Comparative Preparation Examples 1-2 and 1-4 were respectively used instead of the solid electrolyte of Example 1.

Comparative Example 8

A lithium secondary battery was prepared in the same manner as in Example 8, except that poly(vinylidene fluoride (PVDF) was used as a separator instead of the LLZO solid electrolyte, and Li metal was bonded thereto without performing the CIP method.

Evaluation Example 1: Scanning Electron Microscopy (SEM)

Figure 4A:
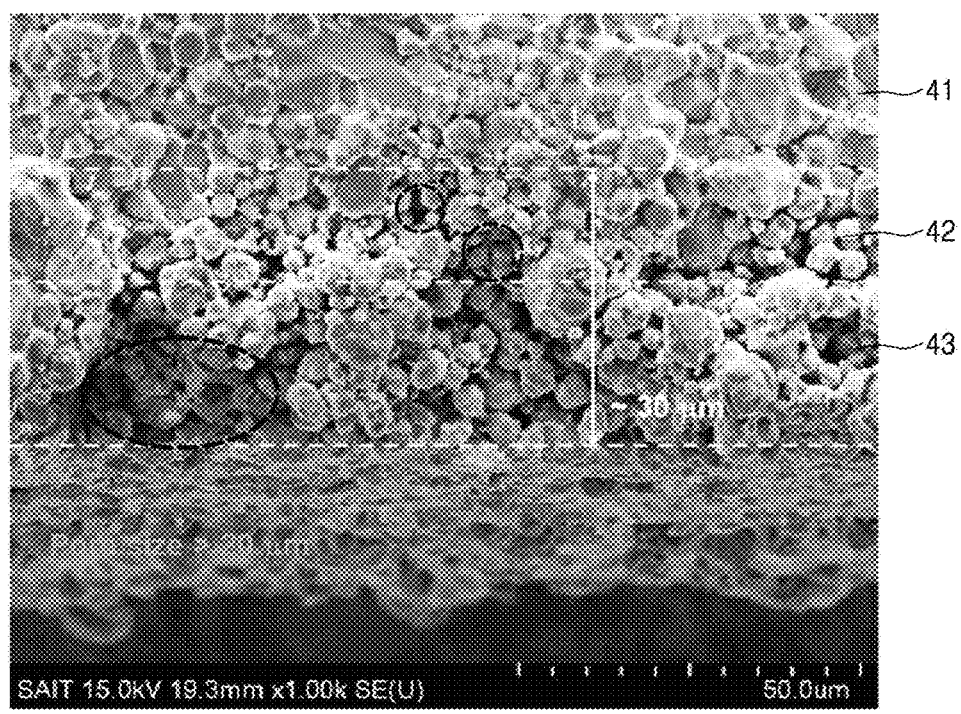
FIG. 4A is a scanning electron microscopic (SEM) image of a cross-section of a solid electrolyte prepared according to Example 1, in which the horizontal dashed lines delineate the layered structure.
Figure 4B:
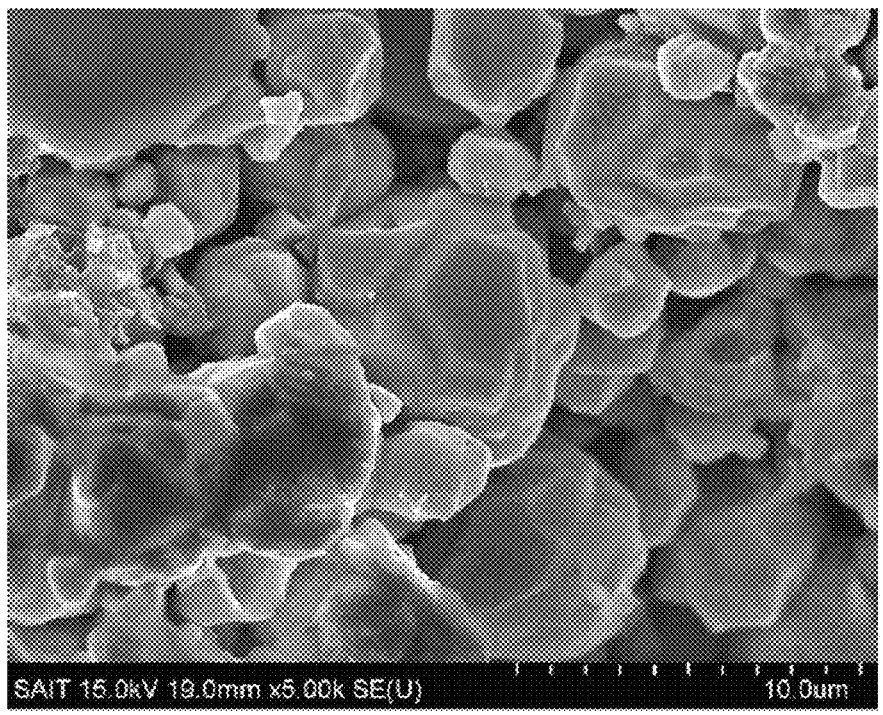
FIG. 4B is an enlarged area of the encircled portion of the image of FIG. 4A.

A cross-sections of the solid electrolytes prepared according to Example 1 and Comparative Preparation Example 1-1 were observed by using a scanning electron microscope (SEM). An SU8030 available from Hitachi, Ltd., was used as the SEM. SEM images of the solid electrolyte of Example 1 are shown in FIGS. 4A and 4B. FIG. 4B is an enlarged view of the oval area in FIG. 4A outlined by dashed lines. In addition, an SEM image of the LLZO film prepared according to Comparative Preparation Example 1-1 is shown in FIG. 4C.

Referring to FIG. 4A, a second porous layer 42 having a thickness of about 10 μm and a pore size of 5 μm or less is formed on an LLZO film 41, and a first porous layer 43 having a thickness of about 20 μm and a pore size greater than 20 μm is formed thereon. A total thickness of the second porous layer 42 and the first porous layer 43 is about 30 μm. In addition, referring to FIG. 4B, small grains are selectively dissolved by acid treatment with a strong acid to form pores and surfaces of the remaining grains are partially dissolved such that the remaining grains have a polyhedral shape deviating from the circular shape.

Figure 4C:
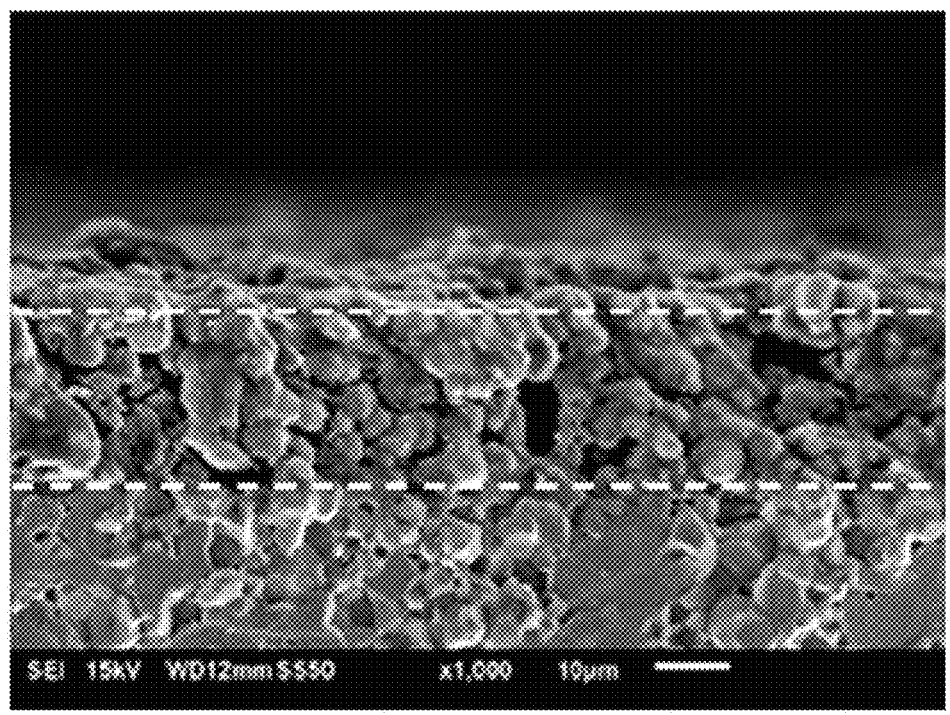
FIG. 4C is an SEM image of a cross-section of a solid electrolyte prepared according to Comparative Preparation Example 1-1, in which the dashed lines delineate the layered structure.

Referring to FIG. 4C, it may be confirmed that the same pore size is distributed over the entire porous layer with no open pores on the surface when the porous layer is formed by screen printing.

Pore size distribution and mechanical strength (Ring on Ring test) of the solid electrolytes prepared according to Examples 6 and 7 and Comparative Example 1-1 were measured. The pore size distribution was measured by using Autopore IV 9520 available from Micromeritics Instrument Corp. and the mechanical strength was evaluated according to the Ring on Ring test, by using a MTS 10D Load Frame, with 0.75 inch diameter support ring, and 0.25 inch diameter load ring available from Sintech corporation.

Figure 5A:
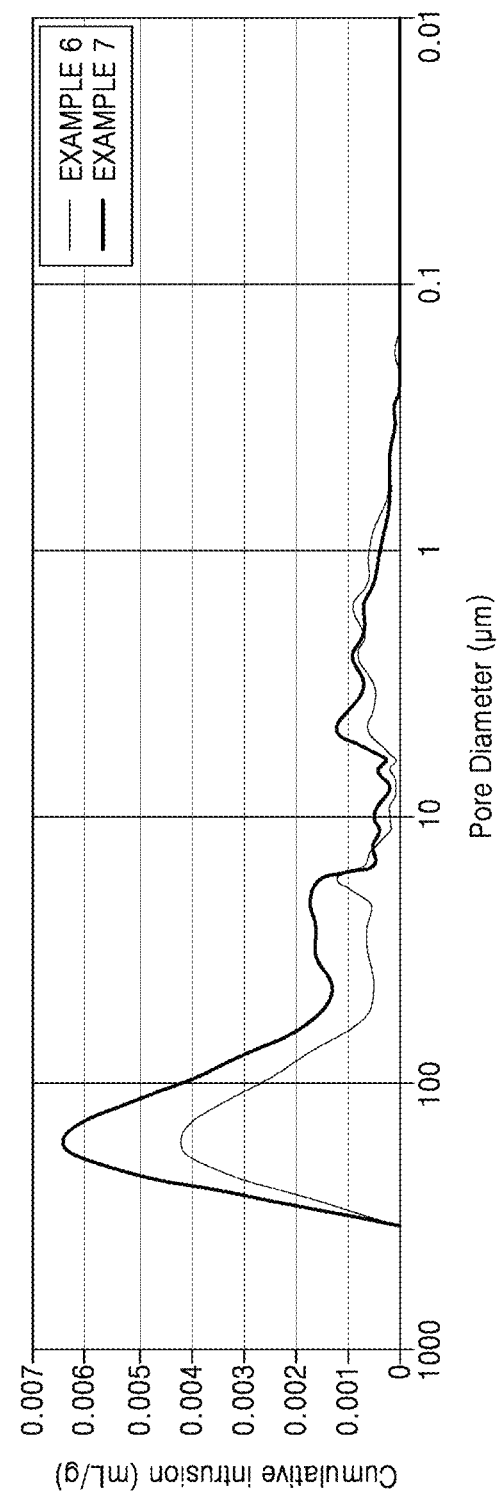
FIG. 5A is a graph of cumulative intrusion (milliliters per gram, mL/g) versus pore diameter (micrometers, μm), illustrating pore size distribution and mechanical strength (Ring on Ring test) of the solid electrolyte prepared according to Examples 6 and 7.
Figure 5B:
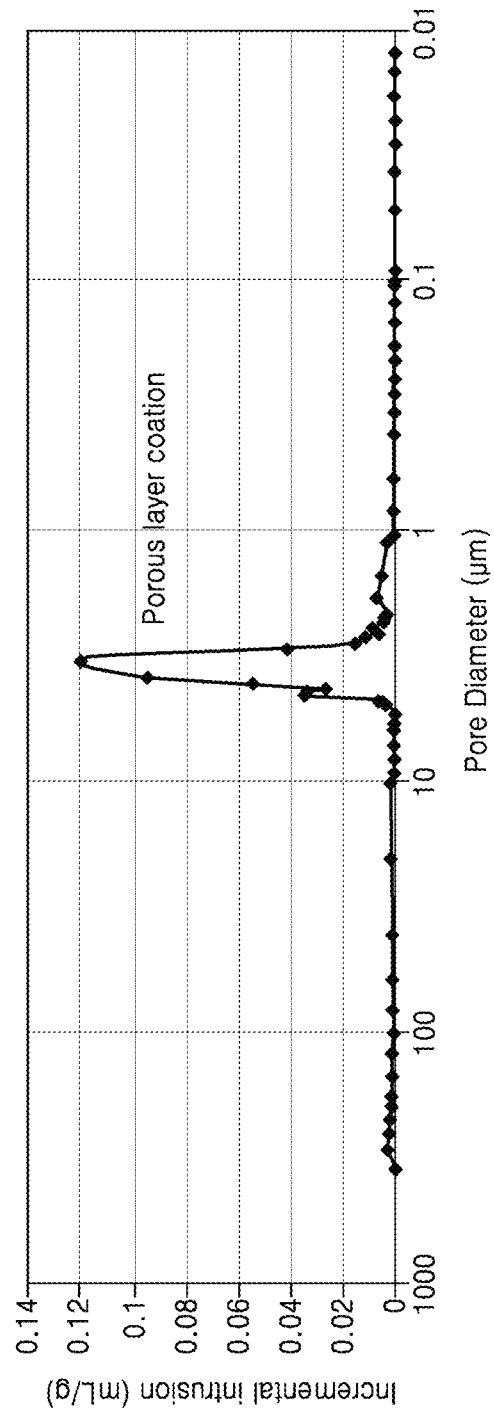
FIG. 5B is a graph of incremental intrusion (mL/g) versus pore diameter (μm), illustrating pore size distribution and mechanical strength (Ring on Ring test) of the solid electrolyte prepared according to Comparative Example 2.

Pore size distributions of the solid electrolytes prepared according to Examples 6 and 7 is shown in FIG. 5A, and Pore size distributions of the solid electrolytes prepared according to Comparative Example 2 is shown in FIG. 5B.

Evaluation results for the mechanical strength of the solid electrolytes prepared according to Example 6 and Comparative Example 2 are shown in Table 3.

TABLE 3

|  | RoR (MPa) |
| --- | --- |
| Example 6 | 139 |
| Comparative Example 2 | 126 |

As illustrated in FIGS. 5A and 5B, it was confirmed that the solid electrolyte prepared according to Example 6 had a wide pore size distribution (200 μm to 0.5 μm) by surface treatment using a 1 M HCl aqueous solution compared with the solid electrolyte prepared according to Comparative Example 2. The solid electrolyte prepared according to Example 6 had a structure in which the pore size gradually decreases from the surface of the solid electrolyte to the inside thereof. In addition, the solid electrolyte of Example 6 had a similar level of mechanical strength to that of the solid electrolyte of Comparative Example 2 that does not include a porous layer. In addition, the mechanical strength of the solid electrolyte of Example 7 was similar to that of the solid electrolyte of Example 6.

Evaluation Example 2: XRD Characteristics

X-ray diffraction (XRD) analysis was performed on the LLZO film of Preparation Example 1 and the solid electrolyte of Example 1. XRD analysis was performed by using a D8 Advance available from Bruker.

Figure 6A:
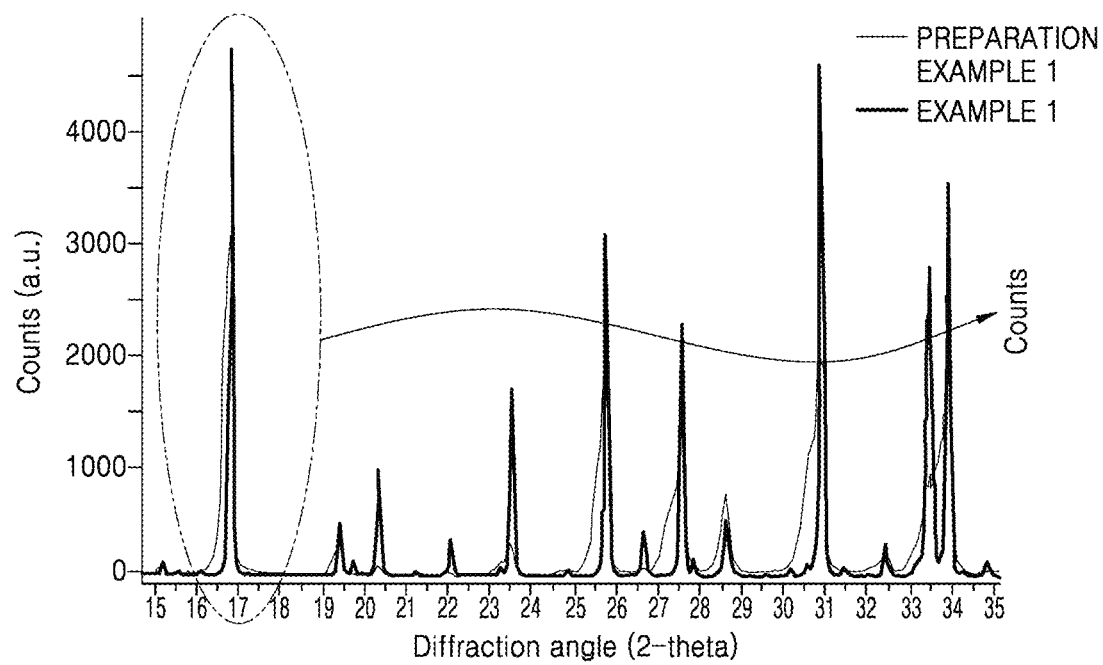
FIG. 6A is a graphs of counts (arbitrary units) versus diffraction angle (degrees 2-theta) illustrating the results of X-ray diffraction (XRD) analysis of an LLZO Film prepared according to Preparation Example 1 and a solid electrolyte prepared according to Example 1, respectively.
Figure 6B:
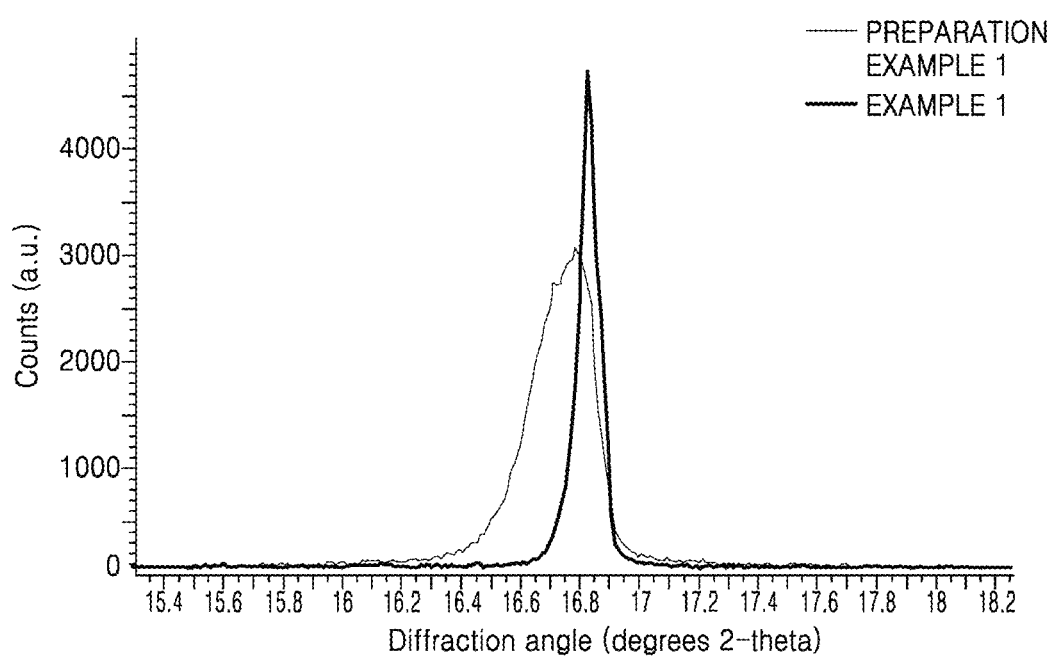
FIG. 6B is an expanded portion of the encircled portion of FIG. 6A.

XRD analysis results are shown in FIGS. 6A and 6B. FIG. 6B is an enlarged view of the area in FIG. 6A marked with a circle. In addition, XRD analysis was performed on the LLZO film of Preparation Example 1 and the solid electrolyte of Example 1 and spacer group, lattice constant a, and average grain size thereof were measured and shown in Table 4. FIG. 6A, and FIG. 6B.

TABLE 4

|  | Space group | a (Å) | Average grain size (nm) |
| --- | --- | --- | --- |
| Preparation Example 1 | Ia-3d (cubic) | 12.958 | 48.1 |
| Example 1 | Ia-3d (cubic) | 12.968 | 279.2 |

Referring to FIGS. 6A and 6B and Table 4, it was confirmed that crystallographic characteristics of the solid electrolyte prepared according to Example 1 have been changed since lithium ions are substituted with protons in comparison with the LLZO film prepared according to Preparation Example 1. As a result of XRD analysis, the acid-treated solid electrolyte had an increased crystallinity and an increased lattice constant due to proton substitution and an increased average grain size due to a decrease in the number of small grains. This was consistent with analysis results of SEM images.

Evaluation Example 3: Impedance Characteristics

Impedance of the lithium secondary batteries of Example 8 and Comparative Example 3 was measured. Impedance was measured by using an impedance analyzer (Solartron 1260A Impedance/Gain-Phase Analyzer) according to a 2-probe method at 60° C. in a frequency range of about $10^6$ megahertz (MHz) to about 0.1 MHz while applying an AC voltage bias of 10 millivolts (mV) in an open-circuit state before lifespan evaluation.

Figure 7A:
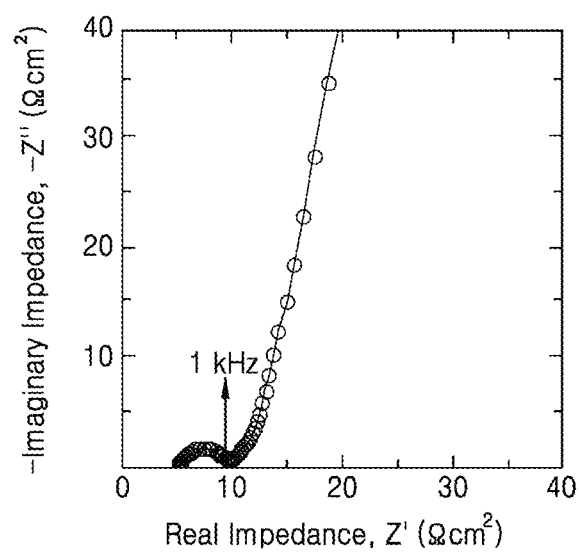
FIGS. 7A and 7B are graphs of imaginary impedance ($-Z$, $ohm^2$) versus real impedance ($Z'$, $ohm^2$) illustrating the impedance characteristics of lithium secondary batteries prepared according to Example 8 and Comparative Example 3, respectively.
Figure 7B:
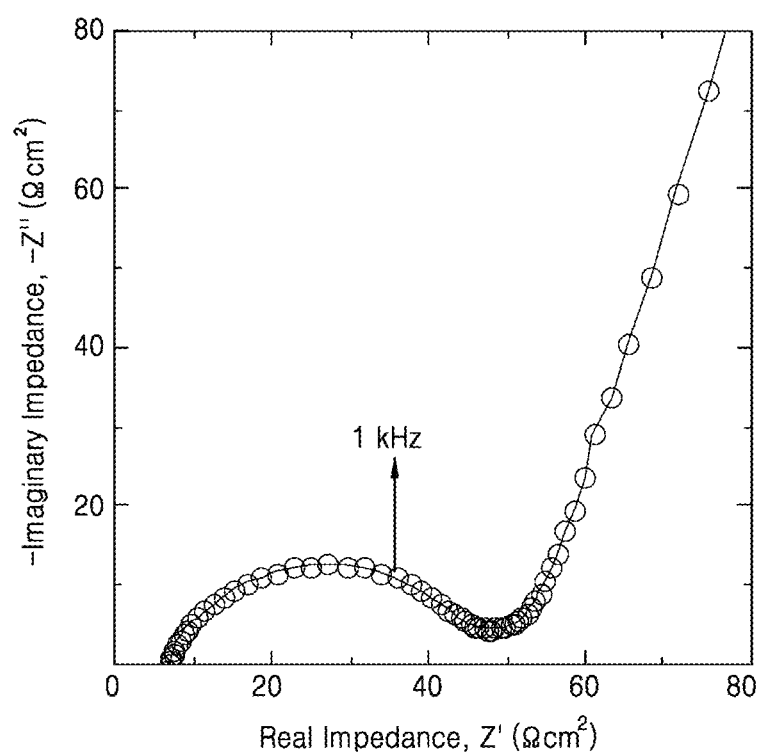

Impedance results are shown in FIGS. 7A and 7B. FIGS. 7A and 7B are graphs illustrating the impedance characteristics of lithium secondary batteries prepared according to Example 8 and Comparative Example 3.

Referring to FIGS. 7A and 7B, an overall interfacial resistance of the lithium secondary batteries of Example 8 was reduced compared with that of the lithium secondary batteries of Comparative Example 3. The interfacial resistance decreased since the surface area increased due to formation of the porous layer on the solid electrolyte and surface impurities such as lithium carbonate ($Li_2CO_3$) are removed due to an increase in interfacial active areas between the solid electrolyte and the lithium metal electrode.

Evaluation Example 4: Charge/Discharge Characteristics

Charge/discharge characteristics of the lithium secondary batteries prepared according to Example 8 and Comparative Examples 3 and 4 were evaluated by a galvanostatic method at a current density of 0.64 mA/cm² under the following conditions.

Each lithium secondary battery was charged in a constant current mode at 60° C. at a current of 0.3 mA/cm² until a voltage reached 4.0 V (vs. Li) and cut-off at a current of 0.15 mA/cm² while maintaining the voltage of 4.0 V in a constant voltage mode. Then, the lithium secondary battery was discharged at a constant current of 0.3 mA/cm² until the voltage reached 2.8 V (vs. Li) ($1^{st}$ cycle, formation cycle).

Charge and discharge of the lithium secondary batteries were repeated 1800 times at 60° C., and at a current of 0.5 mA/cm² and 0.64 mA/cm², respectively.

Figure 8A:
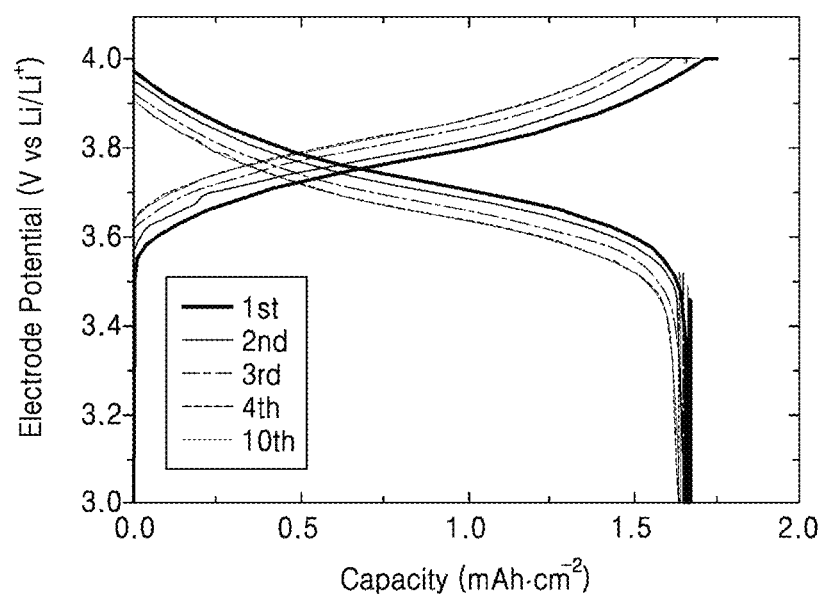
FIGS. 8A to 8C are graphs of electrode potential (volts versus Li/Li$^+$) versus capacity (milliampere-hours per square centimeter, mAh·cm$^{-2}$), illustrating charge/discharge characteristics of lithium secondary batteries prepared according to Example 8 and Comparative Examples 3 and 4, respectively.
Figure 8B:
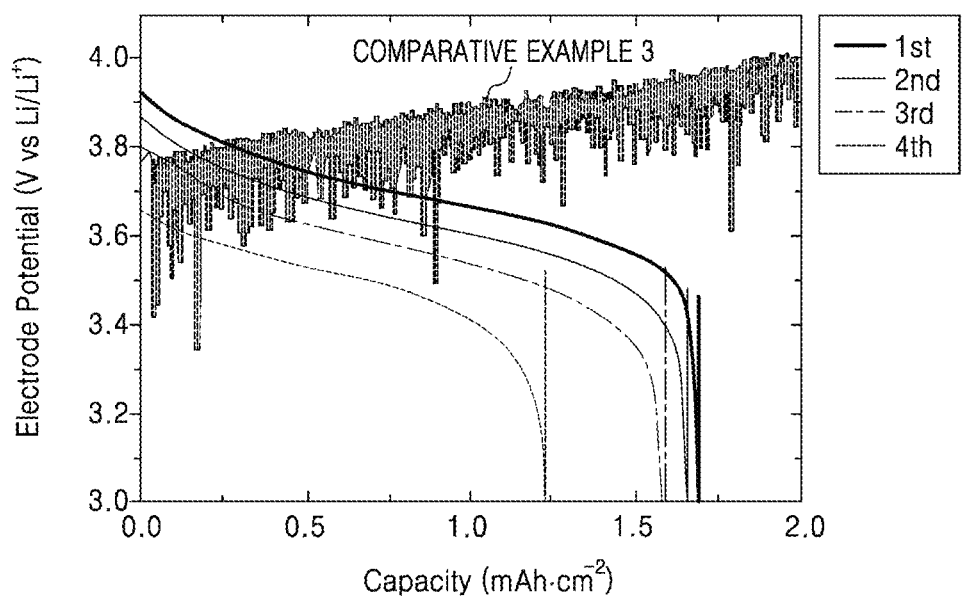
Figure 8C:
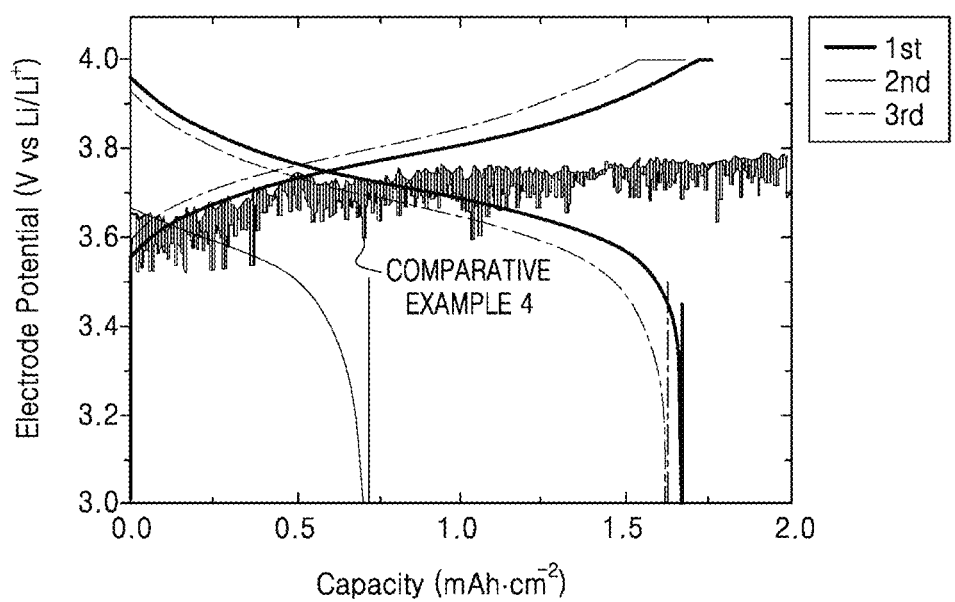

Evaluation results of charge/discharge characteristics of the lithium secondary batteries prepared according to Example 8 and Comparative Examples 3 and 4 are shown in FIGS. 8A to 8C, respectively.

As shown in FIGS. 8B and 8C, in the lithium secondary batteries according to Comparative Examples 3 and 4, voltage noise due to shortage of Li was observed during the $3^{rd}$ and $4^{th}$ charging operations with charge and discharge of the batteries in a constant current (galvanostatic method) at a current density of 0.64 mA/cm².

On the contrary, in the lithium secondary battery prepared according to Example 8, high capacity retention ratios were observed without a short circuit during charge and discharge at least up to the $10^{th}$ cycle. Without being limited by any theory, it is believed that this is because the surface porous layer formed by acid treatment forms a stable interface with lithium metal, and thus Li plating and concentration of stress are prevented at grain boundaries, thereby inhibiting penetration of Li through the solid electrolyte.

Evaluation Example 5: Charge/Discharge Characteristics

1) Example 8 and Comparative Example 8

To confirm lifespan characteristics of the lithium secondary batteries prepared according to Example 8 and Comparative Example 8 at a high current density, each cell having a capacity of 2 mAh/cm² was subjected to a charge and discharge test at an increased current density of 3 mA/cm². Charge and discharge test results of the lithium secondary battery of Example 8 are shown in FIGS. 9A and 9B and charge and discharge test results of the lithium secondary battery of Comparative Example 8 is shown in FIG. 9C.

Figure 9A:
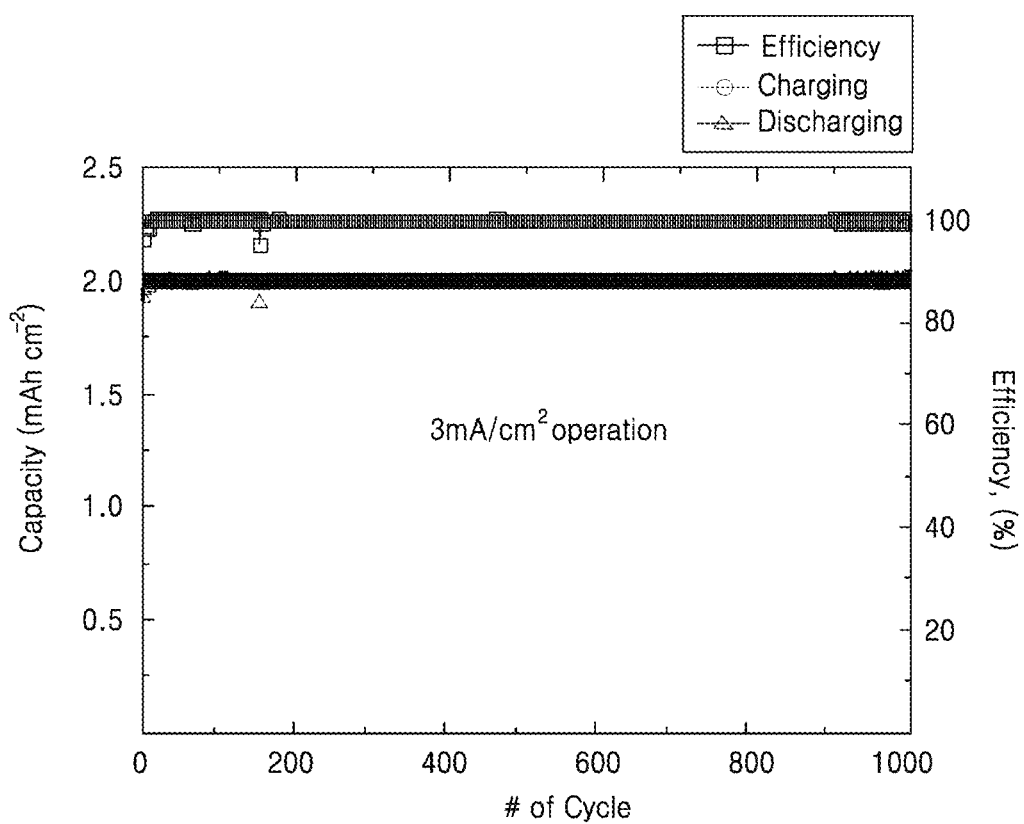
FIG. 9A is a graph of capacity (mAh·cm$^{-2}$) and efficiency (percent, %) versus cycle number, illustrating the capacity and efficiency of the lithium secondary battery prepared according to Example 8.
Figure 9B:
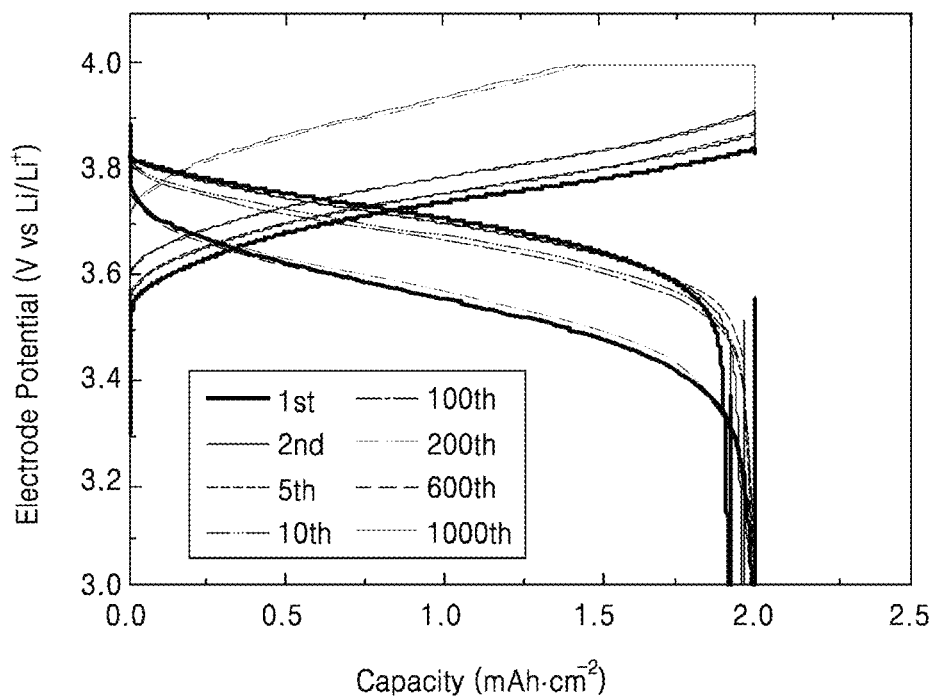
FIG. 9B is a graph of electrode potential (volts versus Li/Li$^+$) versus capacity (mAh·cm$^{-2}$), illustrating the electrode potential of a lithium secondary battery prepared according to Example 8.
Figure 9C:
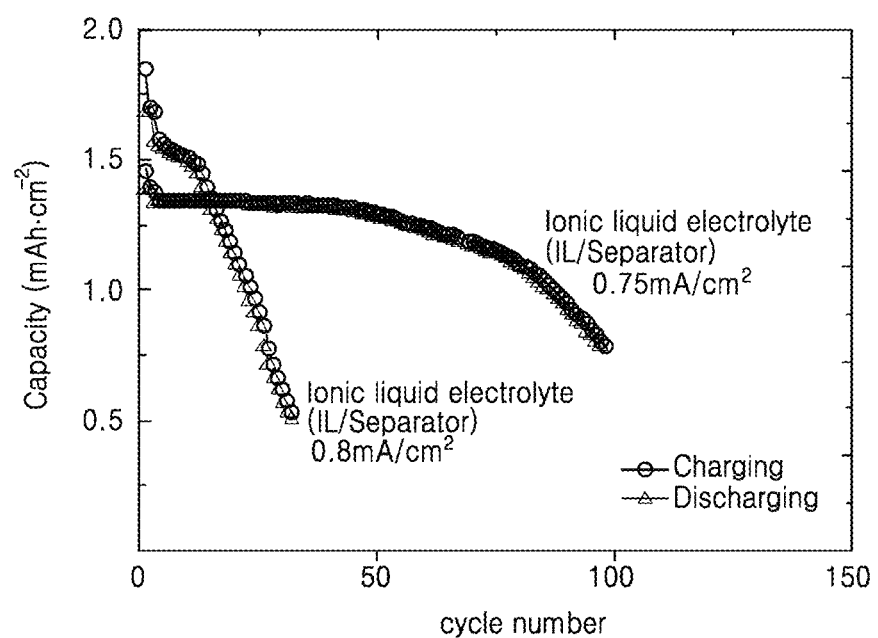
FIG. 9C is a graph of capacity (mAh·cm$^{-2}$) versus cycle number, illustrating the capacity of the lithium secondary battery prepared according to Comparative Example 8.

FIG. 9A is a graph illustrating electrode potential of lithium secondary battery prepared according to Example 8; and FIG. 9B is a graph illustrating electrode potential of a lithium secondary battery prepared according to Example 8 with respect to capacity. FIG. 9C is a graph illustrating electrode potential of lithium secondary battery prepared according to Comparative Example 8 with respect to the number of cycles:

Each lithium secondary battery was charged in a constant current mode at 60° C. at a current of 0.3 mA/cm² until a voltage reached 4.0 V (vs. Li) and cut-off at a current of 0.15 mA/cm² while maintaining the voltage of 4.0 V in a constant voltage mode. Then, the lithium secondary battery was discharged at a constant current of 0.3 mA/cm² until the voltage reached 2.8 V (vs. Li) (1$^{st}$ cycle, formation cycle).

Charge and discharge of the lithium secondary batteries were repeated (1800 times) at 60° C. at a current of 0.75 and 0.8 mA/cm², respectively.

As illustrated in FIGS. 9A and 9B, it may be confirmed that the lithium secondary battery prepared according to Example 8 may operate over 1000 cycles without short circuits and rapid decrease in capacity. It may also be confirmed that the lithium secondary battery of Example 8 had excellent lifespan characteristics by using the solid electrolyte having the porous layer formed by acid treatment. On the contrary, As illustrated in FIG. 9C, lifespan characteristics of the lithium secondary battery of Comparative Example 8 using an ionic liquid electrolyte and a separator deteriorate due to continuous shortage of Li caused by side reactions between the liquid electrolyte and lithium metal. As illustrated in FIG. 9C, the lithium secondary battery of Comparative Example 8 had a capacity retention ratio of 80% or less within 70 cycles.

2) Examples 8 and 11 and Comparative Examples 6 and 7

Figure 13A:
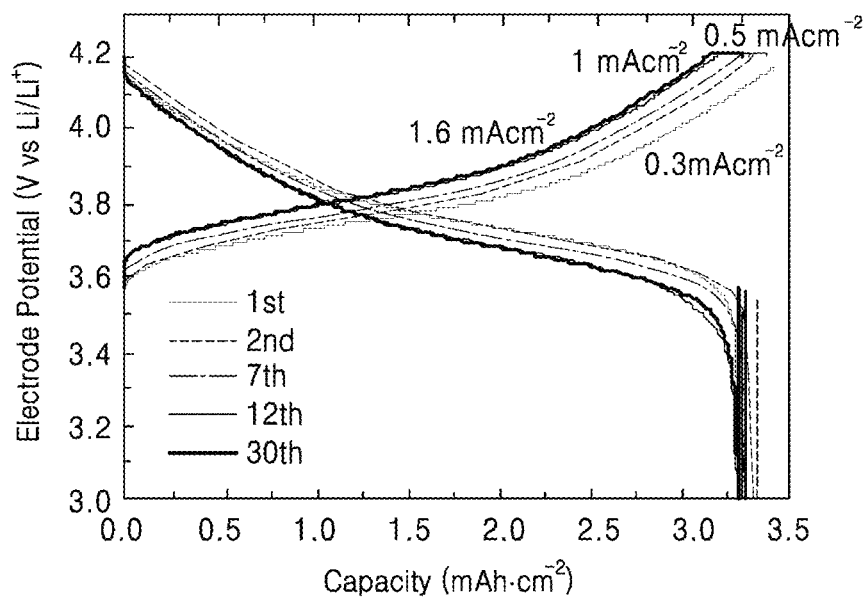
FIGS. 13A and 13B are graphs of electrode potential (volts versus Li/Li$^+$) versus capacity (mAh·cm$^{-2}$) illustrating the electrode potential of lithium secondary batteries prepared according to Examples 8 and 11 with respect to capacity.
Figure 13B:
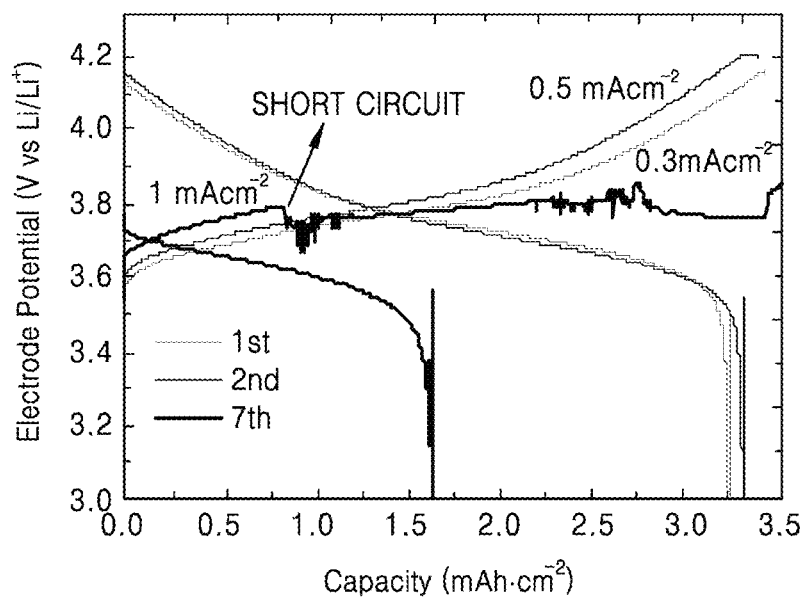
Figure 14A:
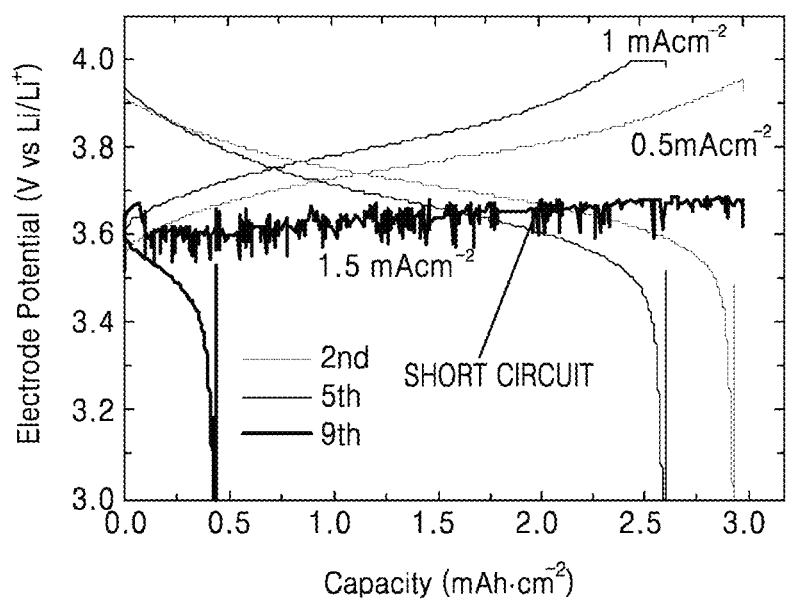
FIGS. 14A and 14B are graphs of electrode potential (volts versus Li/Li$^+$) versus capacity (mAh·cm$^{-2}$), illustrating the electrode potential of lithium secondary batteries prepared according to Comparative Examples 6 and 7.
Figure 14B:
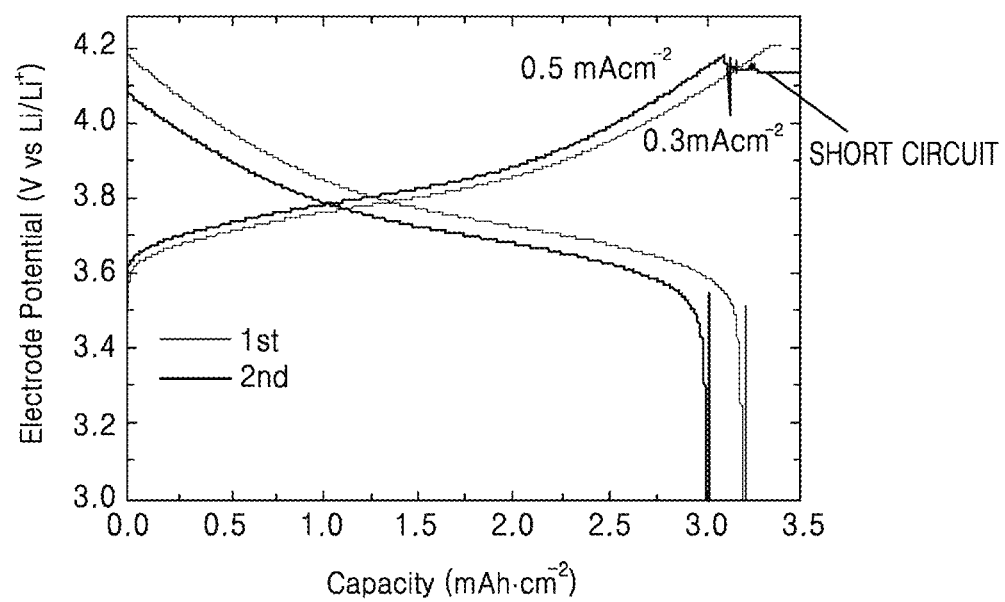

To confirm electrode potential variation of the lithium secondary batteries prepared according to Examples 8 and 11 and Comparative Examples 6 and 7 with respect to capacity, each cell having a capacity of 2 mAh/cm² was subjected to a charging and discharging test at an increased current density of 3 mA/cm². Charge and discharge test results of the lithium secondary batteries of Examples 8 and 11 are shown in FIGS. 13A and 13B and charging and discharging test results of the lithium secondary batteries of Comparative Examples 6 and 7 are shown in FIGS. 14A and 14B.

Each lithium secondary batteries was charged in a constant current mode at 60° C. at a current of 0.3 mA/cm² until a voltage reached 4.0 V (vs. Li) and cut-off at a current of 0.15 mA/cm² while maintaining the voltage of 4.0 V in a constant voltage mode. Then, the lithium secondary batteries were discharged at a constant current of 0.3 mA/cm² until the voltage reached 2.8 V (vs. Li) (1$^{st}$ cycle, formation cycle).

Charging and discharging of the lithium secondary batteries were repeated 1800 times at 60° C. at a current of 0.3 mA/cm², 0.5 mA/cm², and 1.6 mA/cm², respectively.

Based on the results, it may be confirmed that the lithium secondary batteries prepared according to Examples 8 and 11 have better electrode potential characteristics than the lithium secondary batteries prepared according to Comparative Examples 6 and 7, due to the use of the solid electrolytes having the porous layers formed by acid treatment. Without being limited by any theory, it is understood that excellent lifespan characteristics of the lithium secondary batteries of Examples 8 and 11 may be obtained since the effect of the porous layer having a thickness of about 30 μm on inhibiting lithium penetration is improved in the lithium secondary battery of Example 8 and since pores are efficiently formed by maintaining connection states of acid-treated particles by enlarging grain boundaries in the lithium secondary battery of Example 11.

Evaluation Example 6: X-ray Photoelectron Spectroscopy (XPS) Analysis

The LLZO film prepared according to Preparation Example 1 and the solid electrolyte prepared according to Example 1 were subjected to XPS analysis. The XPS analysis was performed using a Quantum 2000 (available from Physical Electronics, Inc., acceleration voltage: 0.5 kiloelectronvolts (keV) to 15 keV, 300 watts (W), energy resolution: about 1.0 eV, and Sputter rate: 0.1 nanometer per minute (nm/min)).

Figure 10A:
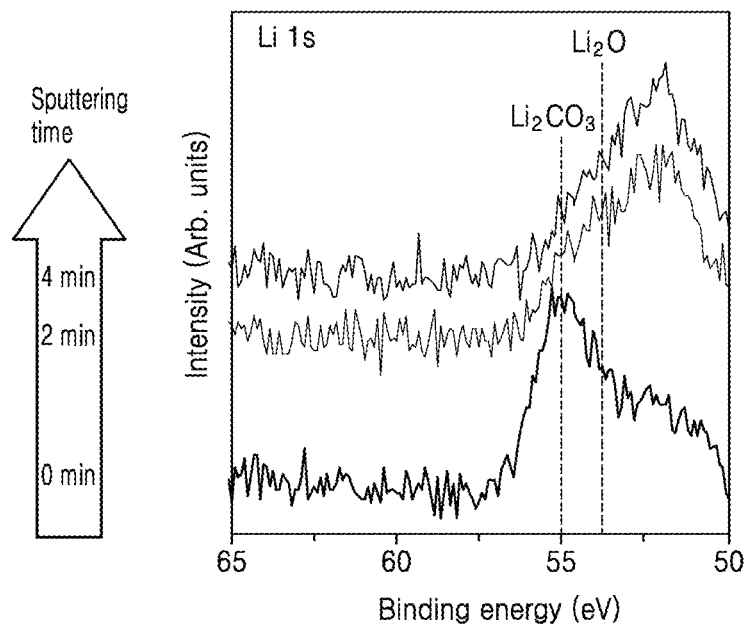
FIGS. 10A to 10C are graphs of intensity (arbitrary units, a.u.) versus binding energy (electron volts, eV), illustrating the results of Li 1s, C 1s, and O 1s X-ray photoelectron spectroscopy (XPS) analysis of an LLZO film prepared according to Preparation Example 1, respectively.
Figure 10B:
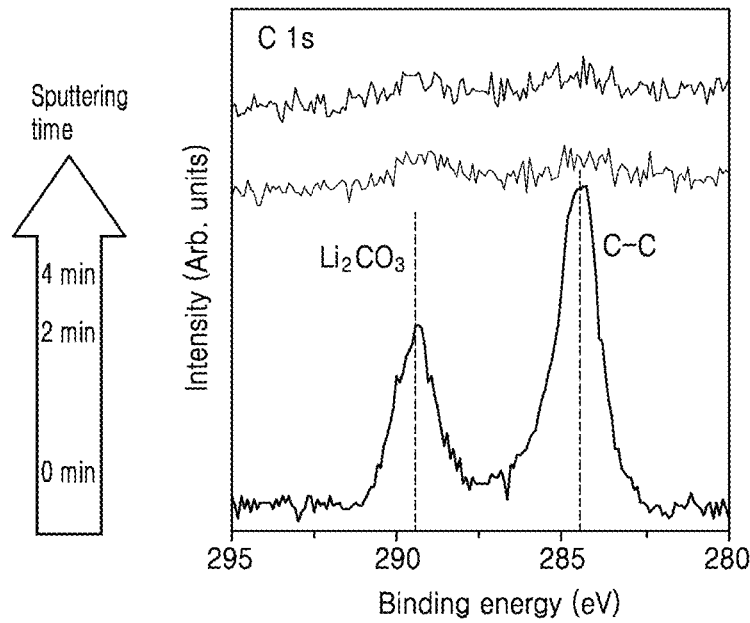
Figure 10C:
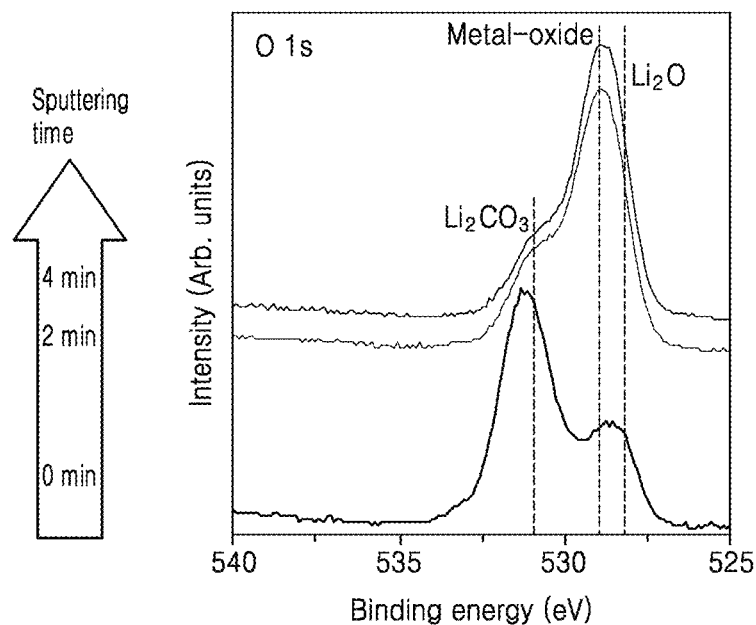
Figure 10D:
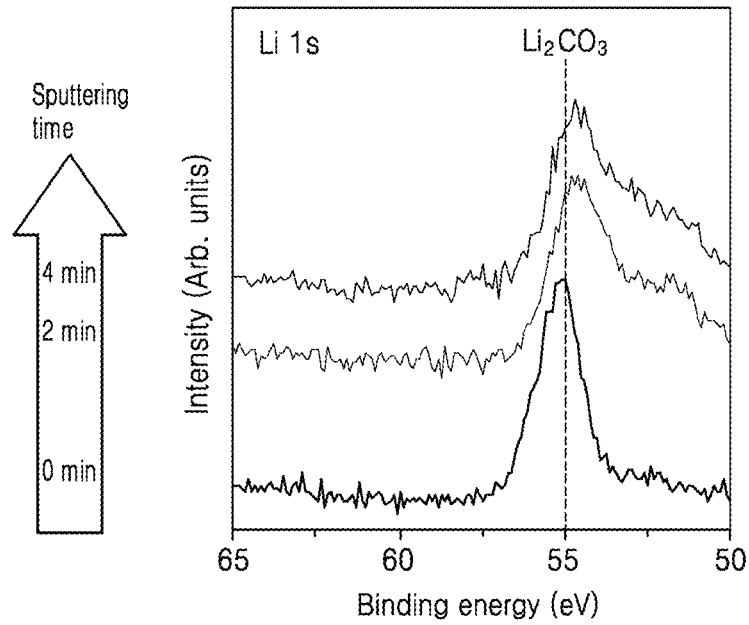
FIGS. 10D to 10F are graphs of intensity (a.u.) versus binding energy (eV) illustrating the results of Li 1s, C 1s, and O 1s XPS analysis of a solid electrolyte prepared according to Example 1, respectively.
Figure 10E:
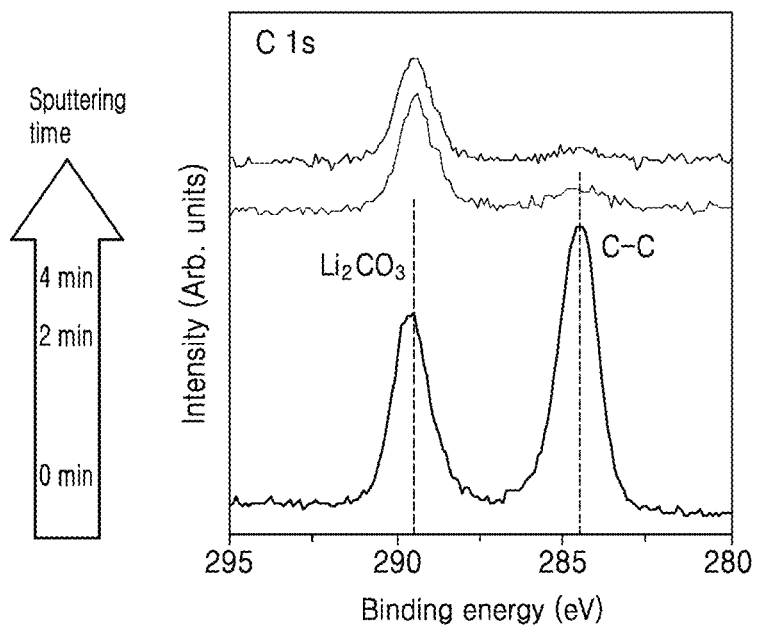
Figure 10F:
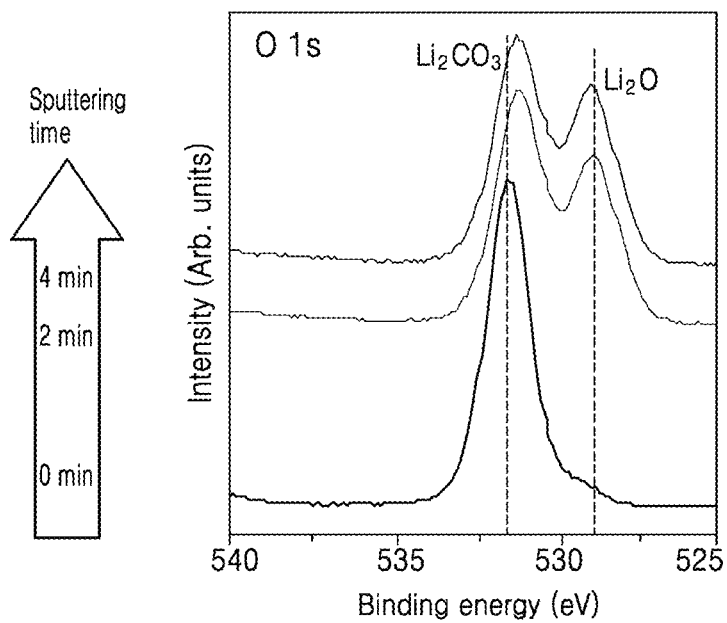

XPS analysis results are shown in FIGS. 10A to 10F. FIGS. 10A to 10C are graphs illustrating Li 1s, C 1s, and O 1s XPS analysis results of an LLZO Film prepared according to Preparation Example 1, respectively, and FIGS. 10D to 10F are graphs illustrating Li 1s, C 1s, and O 1s XPS analysis results of a solid electrolyte prepared according to Example 1, respectively.

Referring to the results of FIGS. 10A to 10F, it may be confirmed that the $Li_2CO_3$ present in the surface and a sub-surface (grain boundary) may also be decomposed and removed by acid-treating the surface of the solid electrolyte. As a result of XPS depth analysis performed on the surface of the solid electrolyte by Ar sputtering, it may be confirmed that the amount of $Li_2CO_3$ was considerably reduced in the acid-treated solid electrolyte up to the sub-surface. Without being limited by theory, since $Li_2CO_3$ is an inactive material having a low electronic conductivity and a low ionic conductivity, rate characteristics of the lithium secondary battery deteriorate due to an increase in resistance of charge-transfer reaction in interfaces between the solid electrolyte and the positive electrode and the negative electrode in the presence of $Li_2CO_3$. In addition, $Li_2CO_3$ may form lithium carbide ($Li_xC$: 0<x<1) by reduction decomposition reactions during charging/discharging to grow Li dendrite, thereby causing short circuits. Thus, rate characteristics and lifespan characteristics of the lithium secondary battery may be improved by using the solid electrolyte from which $Li_2CO_3$ was removed by acid treatment.

Evaluation Example 7: Aging Test

After exposing the solid electrolytes used in the lithium secondary batteries according to Example 8 and Comparative Example 3 to air for about 18 hours, an Li-LLZO-Li symmetric cell was prepared and impedance thereof was measured. Resistance was measured using an impedance analyzer (Solartron 1260A Impedance/Gain-Phase Analyzer) according to a 2-probe method at 60° C. in a frequency range of about 10⁶ MHz to about 0.1 MHz while applying an AC voltage bias of 10 mV thereto.

Figure 11A:
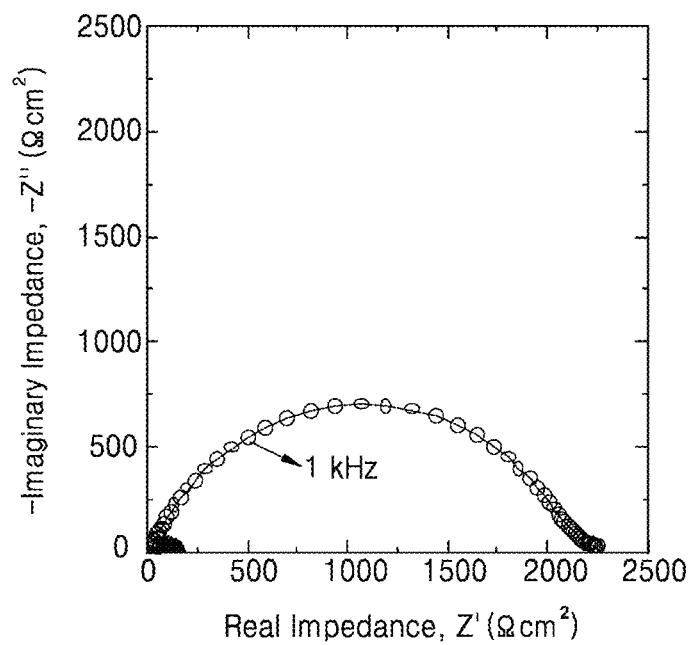
FIGS. 11A and 11B are graphs of imaginary impedance (−Z, ohm$^2$) versus real impedance (Z', ohm$^2$), illustrating the impedance results of Evaluation Example 7, which is an aging test of the lithium secondary batteries prepared according to Comparative Example 3 and Example 8, respectively.
Figure 11B:
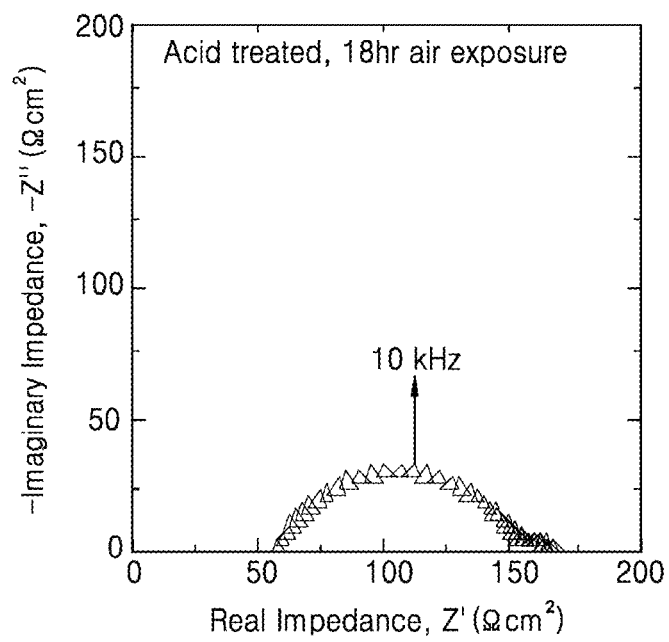

Impedance results of the lithium secondary batteries of Comparative Example 3 and Example 8 are shown in FIGS. 11A and 11B, respectively.

Referring to the results, impedance of the solid electrolyte of Example 8 decreased after being exposed to oxygen in comparison with Comparative Example 3. Thus, it was confirmed that stability in air was improved since formation of lithium carbonate is inhibited on the surface of the solid electrolyte due to substitution of lithium ions with protons.

Evaluation Example 8: Laser Induced Breakdown Spectroscopy (LIBS)

Figure 12A:
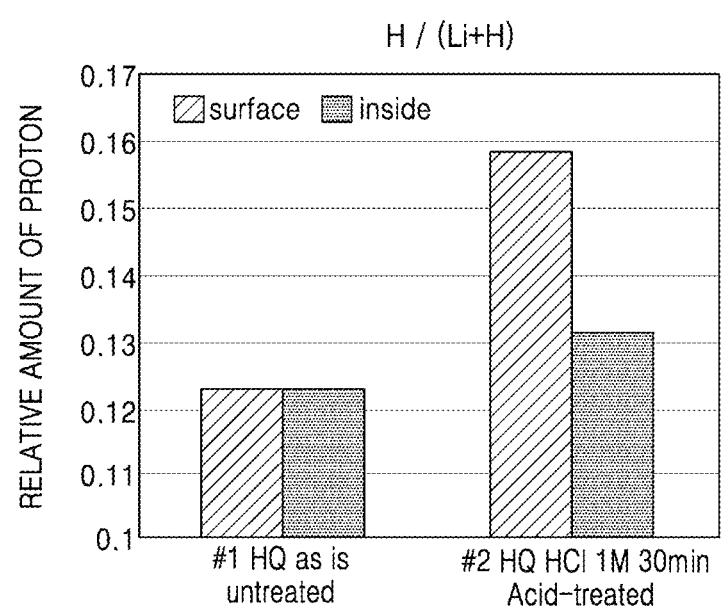
FIG. 12A is a histogram illustrating the relative amount of protons for the solid electrolytes of Example 1 and Preparation Example 1 at the surface and within the solid electrolyte, illustrating the results of Laser Induced Breakdown Spectroscopy (LIBS) analysis of a solid electrolyte prepared according to Example 1 and an LLZO Film prepared according to Preparation Example 1.
Figure 12B:
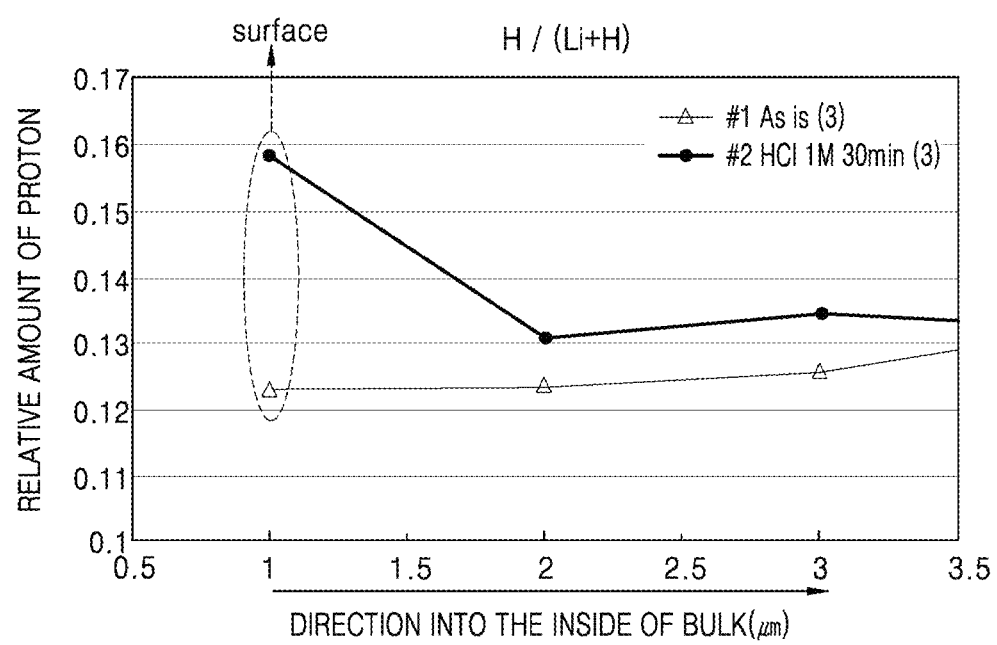
FIG. 12B is a graph of relative amount of protons versus distance from the surface (micrometers, μm) illustrating the results of (LIBS) analysis of a solid electrolyte prepared according to Example 1 and an LLZO Film prepared according to Preparation Example 1.

The solid electrolyte prepared according to Example 1 and the LLZO film prepared according to Preparation Example 1 were analyzed by LIBS. The LIBS was performed using a J200 available from Applied Spectra and analysis results are shown in FIGS. 12A and 12B.

Referring to the results, it was confirmed that the surface of the solid electrolyte of Example 1 was partially substituted with protons by acid treatment and the amount of the protons decreased in an inward direction toward the inside of the bulk material.

Since the solid electrolyte according to an embodiment has an increased contact area with an electrode, interfacial resistance is reduced. In addition, since lithium penetration at grain boundaries of the solid electrolyte is inhibited, short circuits may be reduced. By using the solid electrolyte, secondary batteries having excellent lifespan characteristics may be prepared.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A solid electrolyte comprising:
   an inorganic lithium ion conductive film; and
   a porous layer on a surface of the inorganic lithium ion conductive film,
   wherein the porous layer comprises a first porous layer and a second porous layer,
   wherein the first porous layer is directly on the second porous layer and the second porous layer is disposed between the inorganic lithium ion conductive film and the first porous layer,
   wherein the first porous layer has a pore size which is greater than a pore size of the second porous layer,
   wherein a porosity of the first porous layer is greater than a porosity of the second porous layer, and
   wherein the pore size of the porous layer increases in a direction from the inorganic lithium ion conductive film to an outer surface of the porous layer.

2. The solid electrolyte of claim 1, wherein the porous layer has a total thickness and density to be impermeable to a liquid.

3. The solid electrolyte of clam 1, wherein the porous layer of the solid electrolyte has a thickness of about 5% to about 95% of the total thickness of the solid electrolyte.

4. The solid electrolyte of claim 1, wherein an average pore size of a pore in the porous layer is from about 0.1 micrometer to about 1,000 micrometers.

5. The solid electrolyte of claim 1, wherein a pore in the first porous layer has an average pore size of about 10 micrometers to about 500 micrometers, and
   a pore in the second porous layer has an average pore size of about 0.1 micrometer to about 10 micrometers.

6. The solid electrolyte of claim 1, wherein at least a portion of the solid electrolyte comprises an inorganic lithium ion conductor comprising lithium, and a portion of the lithium substituted by a proton.

7. The solid electrolyte of claim 6, wherein an amount of protons in the porous layer is from about 0.01 mole percent to about 50 mole percent based on the total number of protons and lithium ions.

8. The solid electrolyte of claim 1, wherein the first porous layer comprises a first inorganic lithium ion conductor substituted with about 2% to about 100% protons, and the second porous layer solid electrolyte comprises a second inorganic lithium ion conductor substituted with about 0.01% to about 20% protons, based on the total number of protons and lithium ions.

9. The solid electrolyte of claim 1, wherein the porous layer is a product obtained by:
   acid-treating an inorganic lithium ion conductive film with an acid having a concentration of greater than or equal to about 0.1 molar and less than or equal to about 5 molar.

10. The solid electrolyte of claim 9, wherein the concentration of the acid is from about 0.5 molar to about 4.5 molar.

11. The solid electrolyte of claim 1, wherein the porous layer is a product obtained by:
    forming a multilayer film comprising two or more layers on an inorganic lithium ion conductive film; and
    heat-treating the multilayer film,
    wherein the forming of the multilayer film comprises coating a first composition comprising a pore former on a surface of the inorganic lithium ion conductive film and coating a second composition comprising a pore former on the first composition, wherein the amount of the pore former in the first composition is different from the amount of the pore former in the second composition.

12. The solid electrolyte of claim 1, wherein a lattice constant of the porous layer as measured by X-ray diffraction is greater than a lattice constant of the remaining area of the solid electrolyte excluding the porous layer by about 0.005 angstrom to about 0.1 angstrom, and
    an average grain size of the porous layer is greater than an average grain size of the remaining area of the solid electrolyte excluding the porous layer by twice or more.

13. The solid electrolyte of claim 1, wherein the inorganic lithium ion conductive film comprises at least one of a garnet compound, an argyrodite compound, a lithium super-ion-conductor compound, a Li nitride, a Li hydride, a perovskite, or a Li halide.

14. The solid electrolyte of claim 1, wherein the inorganic lithium ion conductive film comprises at least one of $Li_{3+x}La_3M_2O_{12}$ wherein $0 \leq x \leq 5$ and M is W, Ta, Te, Nb, Zr or a combination thereof, $Li_{3+x}La_3M_2O_{12}$ wherein $0 \leq x \leq 5$ and M is W, Ta, Te, Nb, Zr or a combination thereof, $Li_{1+x+y}Al_xTi_{2-x}Si_yP_{3-y}O_{12}$ wherein $0<x<2$ and $0 \leq y<3$, $BaTiO_3$, $Pb(Zr_aTi_{1-a})O_3$ wherein $0 \leq a \leq 1$, $Pb_{1-x}La_xZr_{1-y}Ti_yO_3$ wherein $0 \leq x<1$ and $0 \leq y<1$, $Pb(Mg_{1/3}Nb_{2/3})O_3$- $PbTiO_3$, $Li_3PO_4$, $Li_xTi_y(PO_4)_3$ wherein $0<x<2$ and $0<y<3$, $Li_xAl_yTi_z(PO_4)_3$ wherein $0<x<2$, $0<y<1$, and $0<z<3$, $Li_{1+x+y}(Al, Ga)_x(Ti, Ge)_{2-x}Si_yP_{3-y}O_{12}$ wherein $0 \leq x \leq 1$ and $0 \leq y \leq 1$, $Li_xLa_yTiO_3$, wherein $0<x<2$, and $0<y<3$, $Li_xGe_yP_zS_w$ wherein $0<x<4$, $0<y\ 1$, $0<z1$, and $0<w<5$, $Li_xN_y$ wherein $0<x<4$, and $0<y<2$, $Li_xSi_yS_z$ wherein $0 \leq x<3$, $0<y<2$, and $0<z<4$, $Li_xP_yS_z$ wherein $0 \leq x<3$, $0<y<3$, and $0<z<7$, $Li_{3x}La_{2/3-x}TiO_3$ wherein $0 \leq x \leq 1/6$, $Li_{1+y}Al_yTi_{2-y}(PO_4)_3$ wherein $0 \leq y \leq 1$, $Li_{1+z}Al_zGe_{2-z}(PO_4)_3$ wherein $0 \leq z \leq 1$, $Li_2O$, LiF, LiOH, $Li_2CO_3$, $LiAlO_2$, a $Li_2O$-$Al_2O_3$-$SiO_2$-$P_2O_5$- $TiO_2$-$GeO_2$ ceramic, $Li_7La_3Zr_2O_{12}$, $Li_{10}GeP_2S_{12}$, $L_{3.25}Ge_{0.25}P_{0.75}S_4$, $Li_3PS_4$, $Li_6PS_5Br$, $Li_6PS_5Cl$, $Li_7PS_5$, $Li_6PS_5I$, $Li_{1.3}Al_{0.3}Ti_{1.7}(PO_4)_3$, $LiTi_2(PO_4)_3$, $LiGe_2(PO_4)_3$, $LiHf_2(PO_4)_3$, $LiZr_2(PO_4)_3$, $Li_2NH$, $Li_3(NH_2)_2I$, $LiBH_4$, $LiAlH_4$, $LiNH_2$, $Li_{0.34}La_{0.51}TiO_{2.94}$, $LiSr_2Ti_2NbO_9$, $Li_{0.06}La_{0.66}Ti_{0.93}Al_{0.03}O_3$, $Li_{0.34}Nd_{0.55}TiO_3$, $Li_2CdCl_4$, $Li_2MgCl_4$, $Li_2ZnI_4$, $Li_2CdI_4$, $Li_{4.9\ 9}Ga_{0.+\delta}La_3Zr_{1.7}W_{0.3}O_{12}$ wherein $0 \leq \delta<1.6$, $Li_{4.9}Ga_{0.5\ +\delta}La_3Zr_{1.7}W_{0.3}O_{12}$ wherein $1.7 \leq \delta \leq 2.5$, or $Li_{5.39}Ga_{0.5+\delta}La_3Zr_{1.7}W_{0.3}O_{12}$ wherein $0 \leq \delta<1.11$.

15. The solid electrolyte of claim 1, wherein the inorganic lithium ion conductive film comprises at least one of a compound of Formula 1 and a compound of Formula 1a:

$$Li_{7-x}M^1{}_xLa_{3-a}M^2{}_aZr_{2-b}M^3{}_bO_{12}, \text{ and} \qquad \text{Formula 1}$$

$$Li_{7-x}La_{3-a}M^2{}_aZr_{2-b}M^3{}_bO_{12}, \qquad \text{Formula 1a}$$

wherein,
in Formula 1, $M^1$ comprises at least one of gallium or aluminum,
in Formulas 1 and 1a, $M^2$ comprises at least one of calcium, strontium, cesium, or barium,
$M^3$ comprises at least one of aluminum, tungsten, niobium, or tantalum, and
$0 \leq x < 3$, $0 \leq a \leq 3$, and $0 \leq b < 2$.

16. The solid electrolyte of claim 1, wherein the inorganic lithium ion conductive film comprises at least one of $Li_7La_3Zr_2O_{12}$, $Li_{6.4}La_3Zr_{1.7}W_{0.3}O_{12}$, $Li_{6.5}La_3Zr_{1.5}Ta_{0.3}O_{12}$, $Li_7La_3Zr_{1.7}W_{0.3}O_{12}$, $Li_{4.9}La_{2.5}Ca_{0.5}Zr_{1.7}Nb_{0.3}O_{12}$, $Li_{4.9}Ga_{2.1}La_3Zr_{1.7}W_{0.3}O_{12}$, $Li_7La_3Zr_{1.5}W_{0.5}O_{12}$, $Li_7La_{2.75}Ca_{0.25}Zr_{1.75}Nb_{0.25}O_{12}$, $Li_7La_3Zr_{1.5}Nb_{0.5}O_{12}$, $Li_7La_3Zr_{1.5}Ta_{0.5}O_{12}$, $Li_{6.272}La_3Zr_{1.7}W_{0.3}O_{12}$, or $Li_{5.39}Ga_{1.61}La_3Zr_{1.7}W_{0.3}O_{12}$.

17. The solid electrolyte of claim 1, wherein a surface of the solid electrolyte comprises $Li_{7-x}H_xLa_3Zr_{2-y}M_yO_{12}$ wherein $0.1 \leq x \leq 7$, $0 \leq y \leq 2$, and M is at least one of W, Ta, Te, or Nb, and the interior of the solid electrolyte comprises $Li_{7-x}H_xLa_3Zr_{2-y}M_yO_{12}$ wherein $0 \leq x \leq 6.5$, $0 \leq y \leq 2$, and M is at least one of W, Ta, Te, or Nb).

18. The solid electrolyte of claim 1, wherein the first porous layer defines a surface of the solid electrolyte and has a porosity of about 5% to about 80%, and the second porous layer has a porosity of about 1% to about 50%.

19. The solid electrolyte of claim 1, wherein the first porous layer comprises a lithium ion conductor substituted with $Li_{7-x}H_xLa_3Zr_2O_{12}$ wherein $0.1 \leq x \leq 7$) and the second porous layer comprises $Li_{7-x}H_xLa_3Zr_2O_{12}$ wherein $0 \leq x \leq 6.5$.

20. The solid electrolyte of claim 1, wherein the first porous layer comprises a lithium ion conductor substituted with $Li_{6.75-x}H_xLa_{2.9}Ga_{0.1}Nb_{0.25}Zr_{1.75}O_{12}$ wherein $0.1 \leq x \leq 6.75$, and the second porous layer comprises $Li_{7-x}H_xLa_3Zr_2O_{12}$ wherein $0 \leq x \leq 6.5$.

21. The solid electrolyte of claim 1, wherein the porous layer has a porosity of about 5% to about 60%, based on a total porosity of the porous layer.

22. The solid electrolyte of claim 1, wherein inorganic lithium ion conductive film comprises an inorganic lithium ion conductor having a particle structure or a columnar structure.

23. The solid electrolyte of claim 22, wherein a grain of the inorganic lithium ion conductor has a polyhedral shape.

24. A secondary battery comprising:
a positive electrode,
a negative electrode, and
the solid electrolyte according to claim 1 interposed between the positive electrode and the negative electrode.

25. The secondary battery of claim 24, further comprising at least one of a liquid electrolyte, a polymer electrolyte, a lithium salt, an ionic liquid, or a polymer ionic liquid.

26. The secondary battery of claim 24, further comprising a solid sulfide electrolyte between the negative electrode and the solid electrolyte.

27. The secondary battery of claim 26, wherein the solid sulfide electrolyte comprises $Li_2S\text{-}P_2S_5\text{-}LiX$ wherein X is at least one of F, Cl, Br, or I.

28. The secondary battery of claim 24, wherein the negative electrode comprises at least one of a lithium metal or a lithium metal alloy.

29. The secondary battery of claim 24, wherein a surface of the solid electrolyte in contact with the negative electrode has a greater pore size than a surface of the solid electrolyte not in contact with the negative electrode, and the pore size in the solid electrolyte decreases in a direction extending away from the negative electrode in the solid electrolyte.

30. The secondary battery of claim 24, wherein the secondary battery is configured to operate greater than 1000 cycles at current density of 3 milliamperes per square centimeter.

31. A method of preparing the solid electrolyte of claim 1, the method comprising:
a first acid treatment comprising acid-treating an inorganic lithium ion conductive film with an acid having a concentration of greater than or equal to about 0.1 molar and less than or equal to about 5 molar to provide a first acid-treated product; and
a first cleaning comprising cleaning the first acid-treated product to provide a cleaned first acid-treated product to prepare the solid electrolyte.

32. The method of 31, further comprising preparing the inorganic lithium ion conductive film by combining an inorganic lithium ion conductor and a lithium compound to prepare a mixture, and heat-treating the mixture.

33. The method of claim 32, wherein the lithium compound comprises at least one of lithium carbonate, lithium hydroxide, or lithium oxide, and
an amount of the lithium compound is from about 0.1 parts by weight to about 10 parts by weight, based on 100 parts by weight of a total weight of the inorganic lithium ion conductor and the lithium compound.

34. The method of claim 31, further comprising a second acid treatment comprising acid-treating the cleaned first acid-treated product with an acid having a concentration of greater than or equal to about 0.1 molar and less than or equal to about 5 molar to provide a second acid-treated product, and a second cleaning comprising cleaning the second acid-treated product.

35. The method of claim 34, wherein a concentration of the acid used in the second acid treatment is less than a concentration of the acid used in the first acid treatment.

36. A method of preparing a solid electrolyte, the method comprising:
forming a multilayer film on a surface of an inorganic lithium ion conductive film, the forming comprising:
coating a first composition comprising a pore former and a lithium ion conductor on a surface of the inorganic lithium ion conductive film, and drying the first composition, and
coating a second composition comprising a pore former and a lithium ion conductor on the dried first composition, and drying the second composition to form the multilayer film; and
heat-treating the multilayer film to prepare the solid electrolyte,
wherein the solid electrolyte comprises
the inorganic lithium ion conductive film; and
a porous layer on a surface of the inorganic lithium ion conductive film,
wherein the porous layer comprises a first porous layer and a second porous layer, wherein the first porous layer is directly on the second porous layer and the second porous layer is disposed between the inorganic lithium ion conductive film and the first porous layer, wherein the first porous layer has a pore size which is greater than a pore size of the second porous layer, wherein a porosity of the first porous layer is greater than a porosity of the second porous layer, and wherein the pore size of the porous layer increases in a direction from the inorganic lithium ion conductive film to an outer surface of the porous layer.

37. The method of claim 36, wherein the pore former comprises at least one of dibutyl phthalate, dimethyl phthalate, diethyl phthalate, dioctyl sebacate, or dioctyl adipate.

* * * * *

UNITED STATES PATENT AND TRADEMARK OFFICE
CERTIFICATE OF CORRECTION

PATENT NO. : 11,038,199 B2  
APPLICATION NO. : 16/298167  
DATED : June 15, 2021  
INVENTOR(S) : Jusik Kim et al.

Page 1 of 2

It is certified that error appears in the above-identified patent and that said Letters Patent is hereby corrected as shown below:

On the Title Page

On the page 2, in item (56), in Column 2, under "Other Publications", Line 11, delete "Li6.25AJ0.25La3ZrO12" and insert -- Li6.25Al0.25La3ZrO12 --.

In the Claims

In Column 27, Line 47, in Claim 3, delete "clam" and insert -- claim --.

In Column 28, Line 48, in Claim 14, delete "O$_3$- PbTiO$_3$," and insert -- O$_3$-PbTiO$_3$, --.

In Column 28, Line 52, in Claim 14, delete "La $_y$TiO$_3$," and insert -- La$_y$TiO$_3$, --.

In Column 28, Line 53, in Claim 14, delete "0<y 1, 0<z1," and insert -- 0<y<1, 0<z<1, --.

In Column 28, Line 58, in Claim 14, delete "LiA1O$_2$," and insert -- LiAlO$_2$, --.

In Column 28, Line 58, in Claim 14, delete "P$_2$O$_5$- TiO$_2$" and insert -- P$_2$O$_5$-TiO$_2$ --.

In Column 28, Line 59, in Claim 14, delete "L$_{3.25}$" and insert -- Li$_{3.25}$ --.

In Column 28, Line 62, in Claim 14, delete "LiA1H$_4$," and insert -- LiAlH$_4$, --.

In Column 28, Line 65, in Claim 14, delete "Li$_{4.9\ 9}$Ga$_{0.+\delta}$" and insert -- Li$_{4.9}$Ga$_{0.5+\delta}$ --.

In Column 28, Line 66, in Claim 14, delete "Ga$_{0.5\ +\delta}$" and insert -- Ga$_{0.5+\delta}$ --.

In Column 29, Line 19, in Claim 16, delete "Zr$_{1.5}$ Ta$_{0.3}$" and insert -- Zr$_{1.5}$Ta$_{0.3}$ --.

In Column 29, Line 20, in Claim 16, delete "Zr$_{1.7}$ W$_{0.3}$" and insert -- Zr$_{1.7}$W$_{0.3}$ --.

Signed and Sealed this  
Fifth Day of November, 2024

Katherine Kelly Vidal  
*Director of the United States Patent and Trademark Office*

CERTIFICATE OF CORRECTION (continued)
U.S. Pat. No. 11,038,199 B2

In Column 29, Line 30, in Claim 17, delete "Nb)." and insert -- Nb. --.

In Column 29, Line 37, in Claim 19, delete "$0.1 \leq x \leq 7$)" and insert -- $0.1 \leq x \leq 7$ --.

In Column 30, Line 25, in Claim 32, delete "method of" and insert -- method of claim --.